US 9,878,860 B2

(12) United States Patent
McSwain

(10) Patent No.: US 9,878,860 B2
(45) Date of Patent: Jan. 30, 2018

(54) ELEVATION CONVEYANCE SYSTEM AND METHOD

(71) Applicant: Mattawa Industrial Services Inc., Dartmouth (CA)

(72) Inventor: R. Kevin McSwain, Sarnia (CA)

(73) Assignee: Mattawa Industrial Services, Inc. (CA)

( * ) Notice: Subject to any disclaimer, the term of this patent is extended or adjusted under 35 U.S.C. 154(b) by 0 days.

(21) Appl. No.: 14/916,997

(22) PCT Filed: Sep. 5, 2014

(86) PCT No.: PCT/CA2014/000675
§ 371 (c)(1),
(2) Date: Mar. 4, 2016

(87) PCT Pub. No.: WO2015/031981
PCT Pub. Date: Mar. 12, 2015

(65) Prior Publication Data
US 2016/0214807 A1 Jul. 28, 2016

(30) Foreign Application Priority Data
Sep. 6, 2013 (CA) .................................. 2826315

(51) Int. Cl.
*B65G 65/42* (2006.01)
*B66B 9/16* (2006.01)
(Continued)

(52) U.S. Cl.
CPC .............. *B65G 65/42* (2013.01); *B01J 8/002* (2013.01); *B01J 8/003* (2013.01); *B65D 90/16* (2013.01);
(Continued)

(58) Field of Classification Search
CPC .......... B65G 65/32; B65G 65/42; B66B 9/16; B66B 17/16; E04G 21/04
See application file for complete search history.

(56) References Cited

U.S. PATENT DOCUMENTS 2,297,572 A * 9/1942 Martin ...................... B66B 9/16
414/595
2,400,939 A * 5/1946 Martin ...................... B66B 9/16
414/595
(Continued)

FOREIGN PATENT DOCUMENTS

CN 102484091 A 5/2012
GB 2319239 A 5/1998
(Continued)

OTHER PUBLICATIONS

Chinese Office Action for CN-2017041301282700 dated Apr. 18, 2017.
(Continued)

Primary Examiner — Anna Momper
Assistant Examiner — Mark Hageman
(74) Attorney, Agent, or Firm — Fishman Stewart PLLC

(57) ABSTRACT

An elevation conveyance system for transporting a payload substantially vertically and transversely to a preselected release location. The system includes a track assembly comprising a substantially vertical track, one or more bin assemblies in which the payload is receivable, and one or more car assemblies configured for movement along the track. The car assembly includes a housing subassembly having a means for engaging the track to permit movement of the car assembly along the track, and a conveyor subassembly for transporting the payload substantially transversely relative to the track. The bin assembly is receivable in the housing subassembly and configured to release the
(Continued)

payload onto the conveyor subassembly for substantially transverse transportation of the payload to the preselected release location.

20 Claims, 42 Drawing Sheets

(51) Int. Cl.
    *B01J 8/00*     (2006.01)
    *B65D 90/16*     (2006.01)
    *B65D 90/66*     (2006.01)
    *B66B 11/02*     (2006.01)
    *B66C 17/06*     (2006.01)
    *E04G 3/28*     (2006.01)
    *B65G 65/32*     (2006.01)

(52) U.S. Cl.
    CPC .............. *B65D 90/66* (2013.01); *B66B 9/16* (2013.01); *B66B 11/02* (2013.01); *B66C 17/06* (2013.01); *B01J 2208/00752* (2013.01); *B65G 65/32* (2013.01); *E04G 3/28* (2013.01)

(56) References Cited

U.S. PATENT DOCUMENTS

| | | | |
|---|---|---|---|
| 3,481,499 A | | 12/1969 | Pierson |
| 3,653,526 A | * | 4/1972 | Kennedy, Jr. ............ B01J 8/003 414/420 |
| 3,768,626 A | | 10/1973 | Vossler et al. |
| 4,546,854 A | * | 10/1985 | Bocker .................... B66B 9/16 182/103 |
| 4,769,127 A | | 9/1988 | Erickson et al. |
| 5,601,156 A | * | 2/1997 | McCarthy ................ B66B 9/00 187/249 |
| 5,799,755 A | * | 9/1998 | Wan ......................... B66B 9/00 187/249 |
| 5,807,059 A | | 9/1998 | Takeda |
| 5,946,217 A | | 8/1999 | Lhoest |
| 6,820,749 B2 | | 11/2004 | Brock et al. |
| 8,196,732 B2 | | 6/2012 | Fatula, Jr. et al. |
| 2003/0185659 A1 | * | 10/2003 | Pfeiffer .............. B65B 69/0083 414/607 |

FOREIGN PATENT DOCUMENTS

| | | |
|---|---|---|
| JP | 54870355 U | 9/1973 |
| JP | 48-70355 B2 | 2/2012 |
| WO | WO-02/088004 A2 | 11/2002 |

OTHER PUBLICATIONS

English translation of JP48-70355 (previously filed in Apr. 22, 2016 IDS).

European Search Report for EP14841950.0, dated Feb. 28, 2017.

* cited by examiner

ELEVATION CONVEYANCE SYSTEM AND METHOD

CROSS-REFERENCES TO RELATED APPLICATIONS

This application is a US National Phase application of International Patent Application PCT/CA2014/000675, filed on Sep. 5, 2014, which claims priority to CA2826315, filed Sep. 6, 2013, both of which are hereby incorporated by reference in their entirety.

TECHNICAL FIELD

The present invention is an elevation conveyance system and method for transporting a payload substantially vertically and transversely to a preselected release location at a top end of a reactor vessel.

BACKGROUND

As is well known in the art, in circumstances where significant quantities of material are required to be moved in a vertical (or substantially vertical) direction and transversely relative to the vertical, the existing systems and methods have various disadvantages. These circumstances can arise in different situations involving various processes.

For example, at certain times, relatively large quantities of a catalyst are required to be delivered into a reactor vessel at a petroleum refinery, at an upper end of the reactor. The upper end may be approximately 200 to 300 feet above ground level.

As is well known in the art, the catalyst may be aluminum oxide ($Al_2O_3$), or zeolites, which are complex aluminosilicates, or the catalyst may be nickel-based or based on other materials. Typically, the catalyst is provided in the form of particulate matter, e.g., with a bulk density of 0.80 to 0.96 $g/cm^3$ and an average particle size between about 1270 μm (0.05 inches) to about 3175 μm (0.125 inches). The catalyst is typically loaded over a period of five to seven days, approximately once every three years. The reactor operates between the loadings of the catalyst. After about three years of operation, the reactor's catalyst is removed and replaced.

It is very important to minimize the reactor's downtime. It is also important to minimize, to the extent practicable, the wear and abrasion to which the catalyst is subjected before it is released into the reactor vessel.

The catalyst typically is provided by its manufacturer in the form of particulate matter (as noted above) in special containers. In the prior art, the usual method of delivering the catalyst to the top of the reactor vessel is to use a crane to lift each container individually to the top of the reactor. The catalyst is dumped out of the container or otherwise released therefrom, and directed into a hopper positioned on top of the reactor vessel. Other materials (e.g., ceramic support material, and grading material) that are particulate matter may also be delivered to the reactor vessel in this way.

The traditional method has a number of disadvantages. First, the capacity of a crane is typically between about 10 tonnes per hour and about 15 tonnes per hour. However, the loader or bin at the top of the reactor typically has a capacity of about 30 tonnes per hour. This means that, to provide the capacity required while loading, at least two cranes are needed, resulting in substantial costs and increased risk. In view of the problems associated with operating two cranes in close proximity to each other, this is rarely done, with the result that the particulate matter is often loaded in practice at a rate below the capacity of the loader or bin at the top of the reactor. It is anticipated that the loader capacity may increase to approximately 60 tonnes per hour, and it is not clear how this capacity could be met by the prior art.

Second, the traditional method can be dangerous. Typically, the crane raises the container to a position above a hopper in which the load from the container is receivable. The hopper is located above the reactor, and is configured to control the flow of the particulate matter into the reactor. The hopper typically includes a lid or covering that is normally in place on the hopper, to prevent rain and snow from entering into the hopper. Generally, the covering is removed only to permit the particulate matter to be loaded into the hopper. After the covering is removed, the particulate matter may flow from the container into the hopper, under the influence of gravity.

Third, the crane is often unable to operate. In general, the crane cannot operate safely if winds are greater than 25 km/hour. Where winds are between 20 km/hour and 25 km/hour, whether the crane operates is at the crane operator's discretion. Those skilled in the art would appreciate that, even in a light breeze, a worker positioning the container above the hopper is at risk of potential pinch points. Because of these limitations, loading is often required to be shut down until weather conditions improve. The delays in loading the reactor vessel due to weather conditions are extremely costly.

There are other disadvantages. For instance, if precipitation is falling when the container is above the open hopper, then some of the precipitation inevitably falls into the catalyst, which is undesirable because it adversely affects the effectiveness of the catalyst. Also, using the traditional method, personnel are required to be located at the top of the reactor, and at least partially exposed to the weather, in order to open the hopper, and to position the container on the hopper.

Other methods of vertically (or substantially vertically) moving and delivering the catalyst to the top of the reactor vessel have been tried, e.g., chain, bucket, pneumatic and vacuum conveying. In general, these methods have the disadvantage that they tend to abrade and degrade the catalyst excessively. Mechanical reliability is also frequently an issue with these alternative methods.

SUMMARY

There is a need for an elevation conveyance system and method that mitigates or overcomes at least one of the disadvantages or shortcomings of the prior art. Such disadvantages or shortcomings are not necessarily listed in those set out above.

In its broad aspect, the invention provides an elevation conveyance system for transporting a payload substantially vertically and transversely to a preselected release location. The system includes a track assembly having a substantially vertical track, one or more bin assemblies in which the payload is receivable, and one or more car assemblies configured for movement along the track. The car assembly includes a housing subassembly having a means for engaging the track to permit movement of the car assembly along the track and a conveyor subassembly for transporting the payload substantially transversely relative to the track. The bin assembly is receivable in the housing subassembly and configured to release the payload onto the conveyor subassembly for substantially transverse transportation of the payload to the preselected release location.

In another of its aspects, the invention provides a car assembly configured for movement along a substantially vertical track to carry a payload up the track. The car assembly includes a housing subassembly having a means for engaging the track to permit movement of the car assembly along the track, the payload being receivable in the housing subassembly, and a conveyor subassembly for transporting the payload substantially transversely relative to the track.

In yet another aspect, the invention provides a method of transporting particulate matter to a reactor vessel for release therein. The method includes the steps of, first, locating the particulate matter in a car assembly configured for substantially vertical movement along a track. The car assembly, with the particulate matter therein, is raised to a preselected location relative to the reactor vessel. The particulate matter is moved at least partially transversely relative to the track from the car assembly to the opening at the top of the reactor vessel, for release of the particulate matter into the reactor vessel.

In yet another of its aspects, the invention provides a base pallet for use with a container in which particulate matter is receivable, the container including an opening through which the particulate matter is movable out of the container under the influence of gravity. The container additionally includes a gate movable between a closed position, in which the gate obstructs the opening, and an open position, in which the opening is unobstructed by the gate. The base pallet includes a base plate comprising an aperture therein, the container being positionable on the base pallet in a predetermined position in which the opening is at least partially vertically aligned with the aperture, and a gate control device. The gate control device includes an engagement element engageable with the gate when the container is in the predetermined position, and a gate control subassembly for moving the engagement element relative to the base plate between a first position, in which the engagement element locates the gate in the open position thereof, and a second position, in which the engagement element locates the gate in the closed position thereof. The gate control device also includes an activating element for controlling the gate control subassembly, to control movement of the engagement element between the first and second positions.

In another aspect, the invention provides a bin assembly in which particulate matter is receivable. The bin assembly includes a container portion in which the particulate matter is receivable, the container portion having an opening through which the particulate matter is movable out of the container under the influence of gravity. Also, the bin assembly has a gate movable between a closed position, in which the gate obstructs the opening, and an open position, in which the opening is unobstructed by the gate, and a base plate for supporting the container portion, the base plate having an aperture at least partially vertically aligned with the opening. The bin assembly also includes a gate control device including an engagement element engaging the gate and a gate control subassembly for moving the engagement element relative to the base plate between a first position, in which the engagement element locates the gate in the open position thereof, and a second position, in which the engagement element locates the gate in the closed position thereof. The gate control device also includes an activating element for controlling the gate control subassembly, to control movement of the engagement element between the first and second positions.

BRIEF DESCRIPTION OF THE DRAWINGS

The invention will be better understood with reference to the attached drawings, in which.

DETAILED DESCRIPTION

Figure 1A:
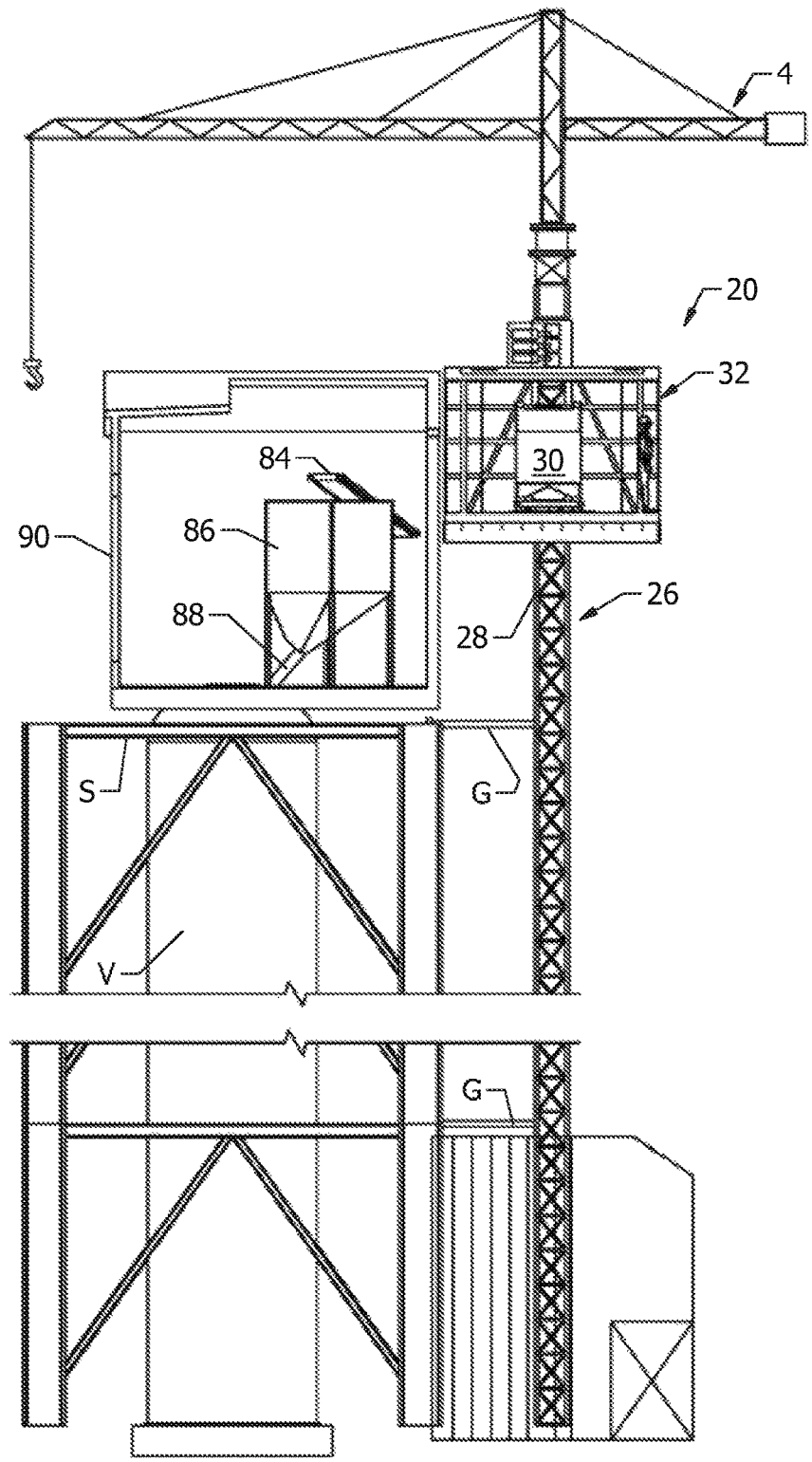
FIG. 1A is a side view of an embodiment of an elevation conveyance system of the invention including a car assembly mounted on a track beside a reactor.
Figure 1B:
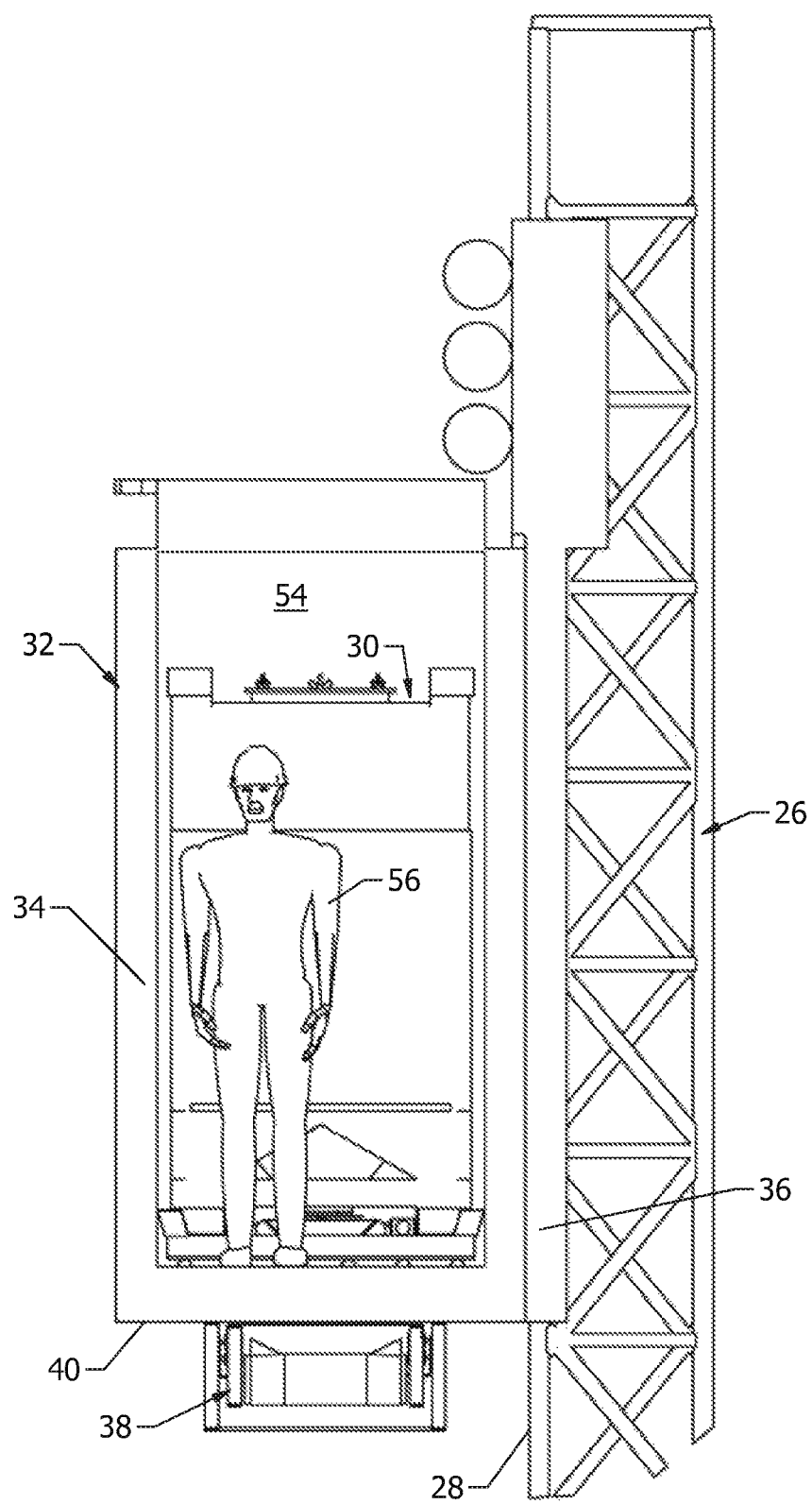
FIG. 1B is a partial cross-section of an embodiment of the car assembly of the invention mounted on the track, drawn at a larger scale.
Figure 6A:
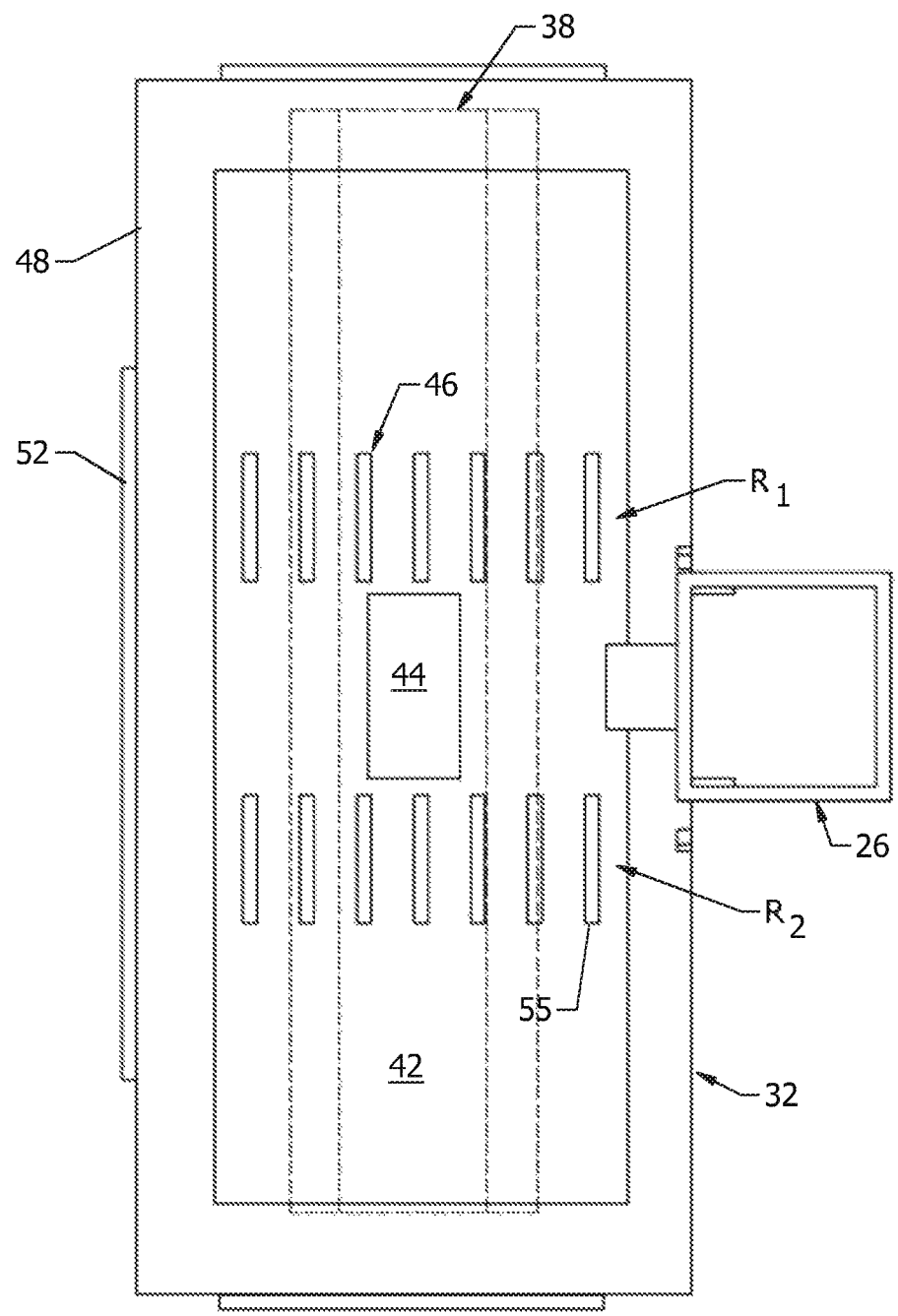
FIG. 6A is a top view of an embodiment of a floor portion of the car assembly mounted on the track, drawn at a smaller scale.

In the attached drawings, like reference numerals designate corresponding elements throughout. Reference is first made to FIGS. 1A-4B and 6A-10D to describe an embodiment of an elevation conveyance system in accordance with the invention indicated generally by the reference numeral 20. As will be described, the elevation conveyance system 20 is for transporting a payload 22 (FIG. 6C) substantially vertically and transversely to a preselected release location "X" (FIGS. 2B, 7E). In one embodiment, the system 20 preferably includes a track assembly 26 having a substantially vertical track 28, one or more bin assemblies 30 in which the payload 22 is receivable (FIGS. 1A, 6C), and one or more car assemblies 32 configured for movement along the track 28 (FIG. 1B). It is also preferred that the car assembly 32 includes a housing subassembly 34 (FIG. 3B) with a means 36 for engaging the track 28 (FIG. 1B) to permit movement of the car assembly 32 along the track 28, and a conveyor subassembly 38 (FIG. 3B) for transporting the payload 22 substantially transversely relative to the track 28. As can be seen in FIGS. 1A, 1B, and 6C, it is also preferred that the bin assembly 30 is receivable in the housing subassembly 34 and configured to release the payload 22 onto the conveyor subassembly 38 for substantially transverse transportation of the payload 22 to the preselected release location.

In one embodiment, the car assembly 32 preferably is movable along the track 28 between a ground position (FIGS. 1D, 3A) and a discharge position (FIGS. 1A, 2B). As can be seen, for instance, in FIGS. 3A, 3H, and 4B, when the car assembly 32 is located at the ground position, the bin assembly 30 may be received in the car assembly 32, and also the bin assembly 30 may be removed from the car assembly 32. When the car assembly 32 is at the discharge position (FIGS. 1A, 2B), the conveyor subassembly 38 may be moved to an extended condition (FIGS. 2B, 7A, 7B, 7E), so that the payload 22 in the bin assembly 30 may be discharged, as will be described. Those skilled in the art would appreciate that, while the car assembly 32 is at the ground position, and while it is moving between the ground position and the raised or discharge position thereof, the conveyor subassembly 38 is in a retracted condition (FIG. 3B), as will also be described. When the conveyor subassembly 38 is in the retracted condition, it is positioned to permit travel of the car assembly along the track.

It will be understood that the track 28 and the track assembly 26 are of conventional construction. Accordingly, further description of the track 28 and the track assembly 26 and the means 36 for engaging the track 28 is not required.

A reactor vessel "V" into which the payload is ultimately delivered is preferably surrounded and supported by a support structure "S" (FIGS. 1A, 3A), which also may support the track 28. The track assembly 26 preferably is secured to the structure "S" in a conventional manner, by girders or beams "G" (FIG. 1A). It will be understood that the payload is particulate matter that may be the catalyst or other material, e.g., ceramic support material or grading material.

Figure 1C:
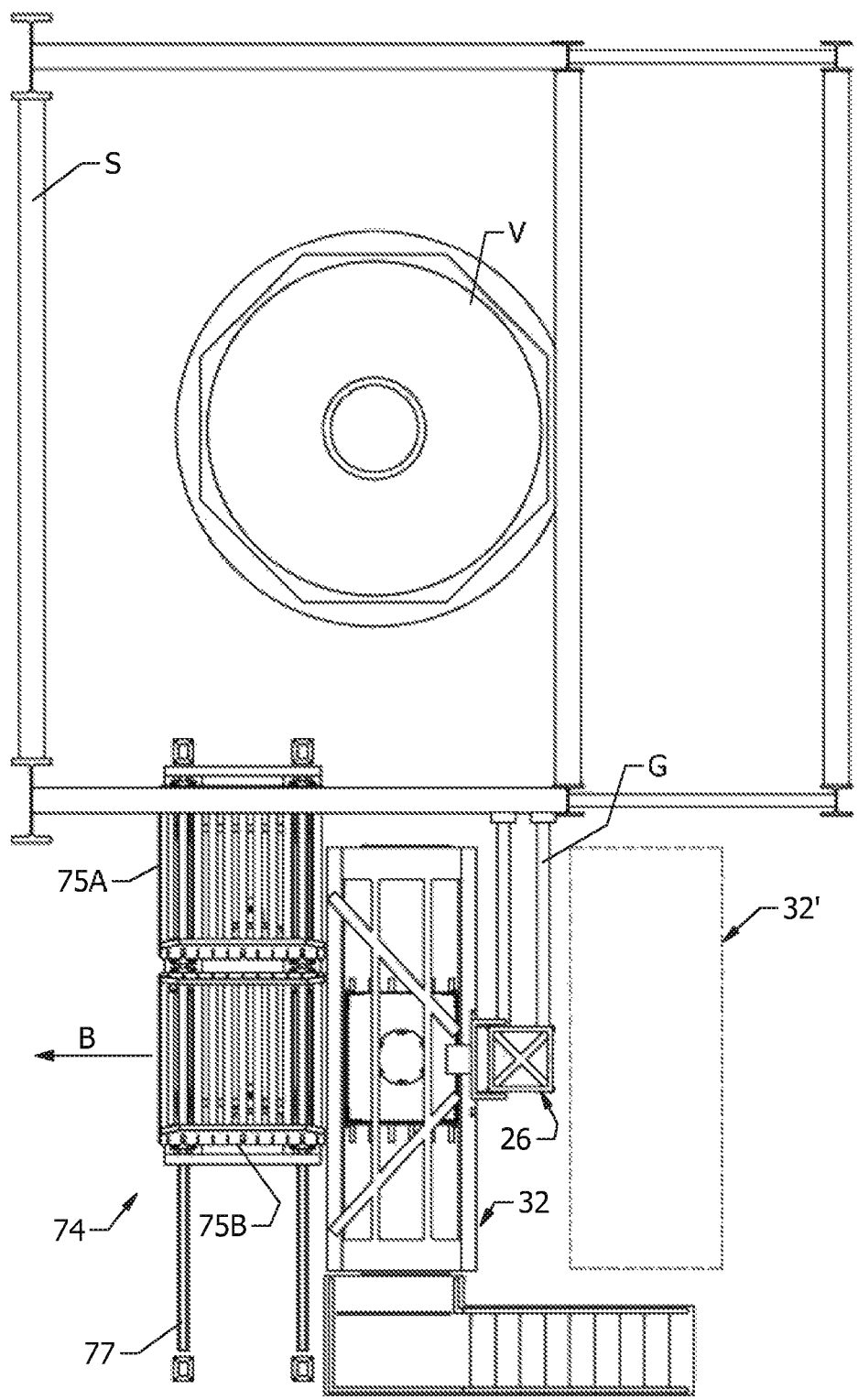
FIG. 1C is a top view of the system of FIG. 1A including an embodiment of a transfer assembly of the invention including two carriage subassemblies thereof in an unloading position, drawn at a smaller scale.
Figure 1D:
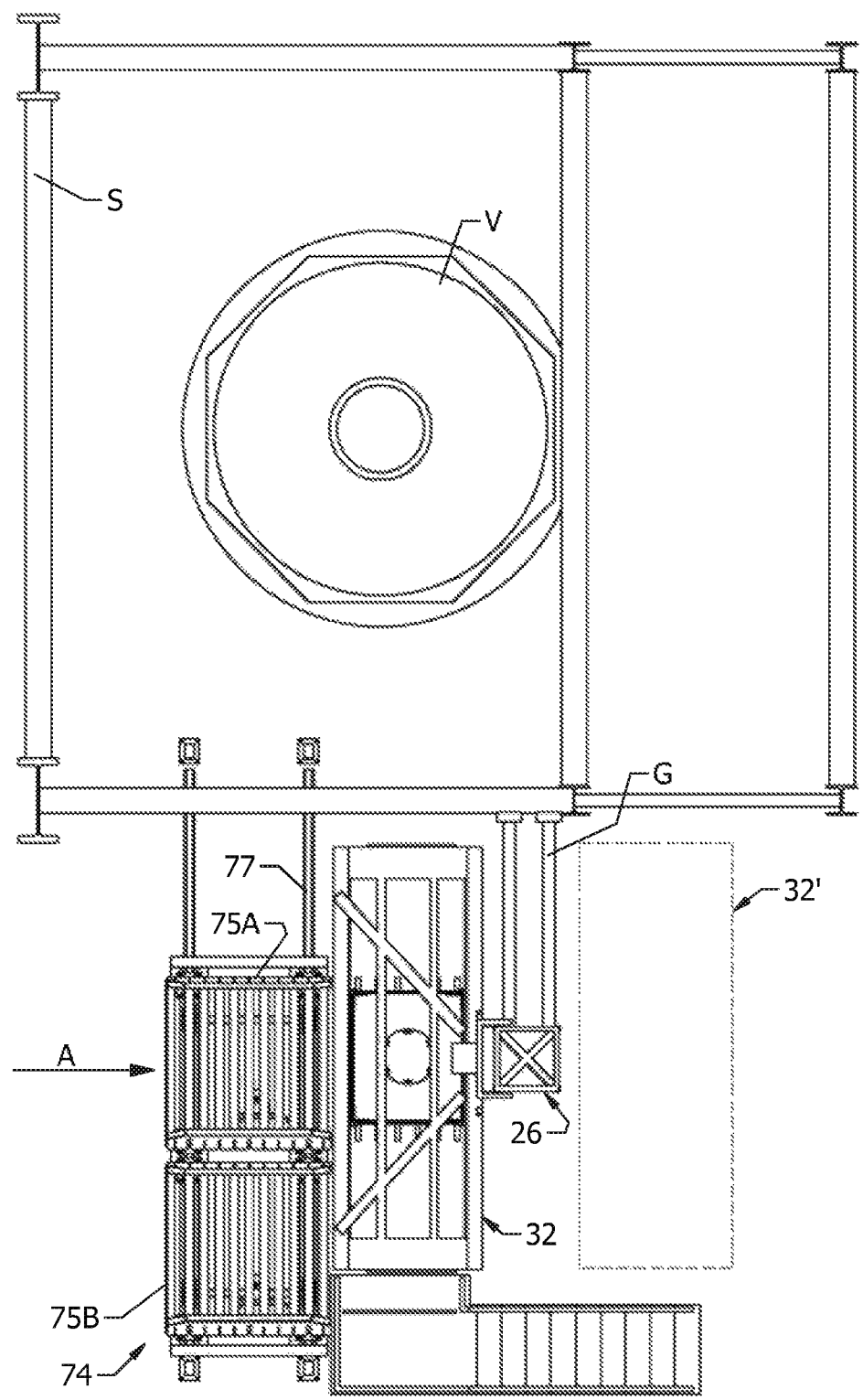
FIG. 1D is a top view of the system of FIG. 1C showing the carriage subassemblies in a loading position thereof.
Figure 3A:
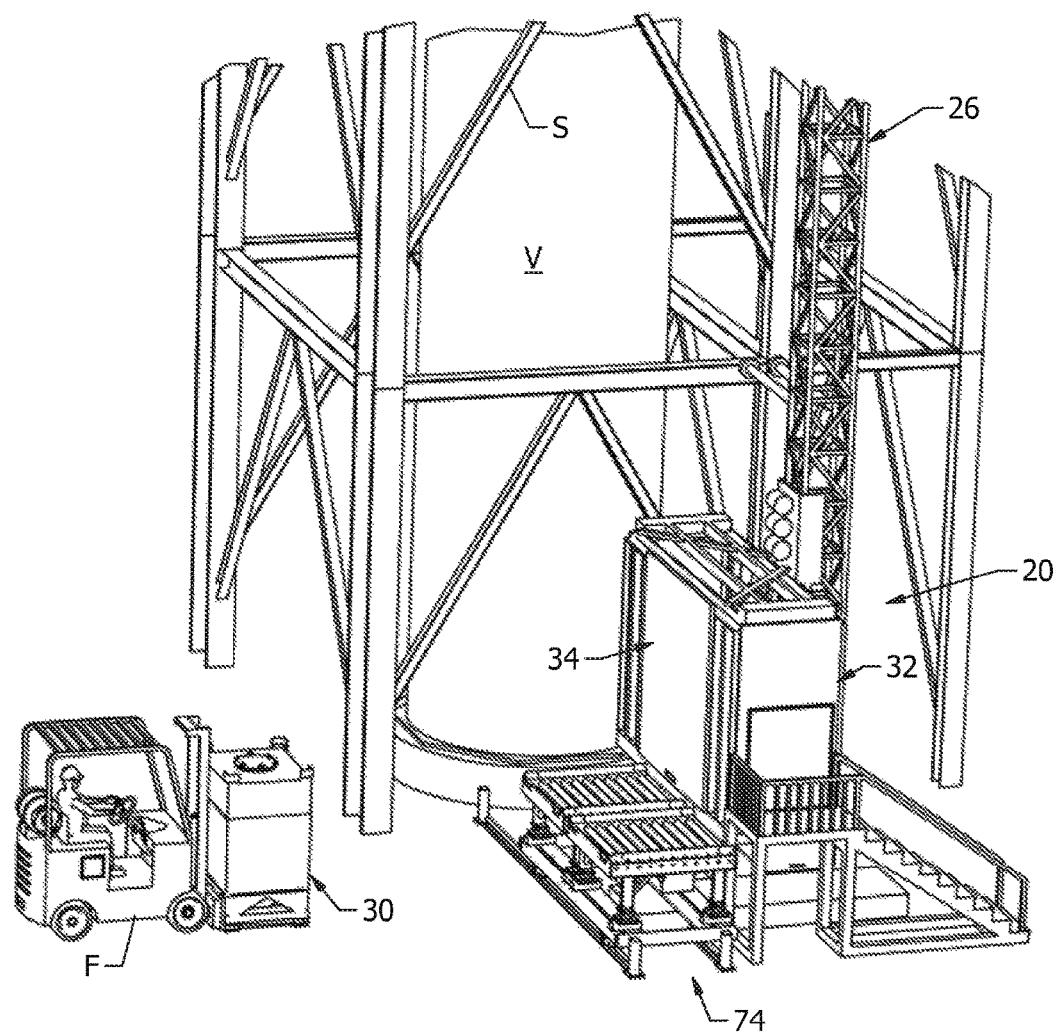
FIG. 3A is an isometric view of an embodiment of the transfer assembly of the invention, with the car assembly at the ground position thereof, drawn at a smaller scale.

In one embodiment, and as can be seen in FIGS. 1C, 1D, and 3A, the elevation conveyance system 20 preferably also includes a transfer assembly 74 for moving the bin assembly 30 at least partially into the housing subassembly 34. (It will be understood that the transfer assembly 74 is omitted from FIG. 1A for clarity of illustration.) It is also preferred that the transfer assembly 74 is configured for moving the bin assembly 30 at least partially out of the housing subassembly 34.

Figure 3B:
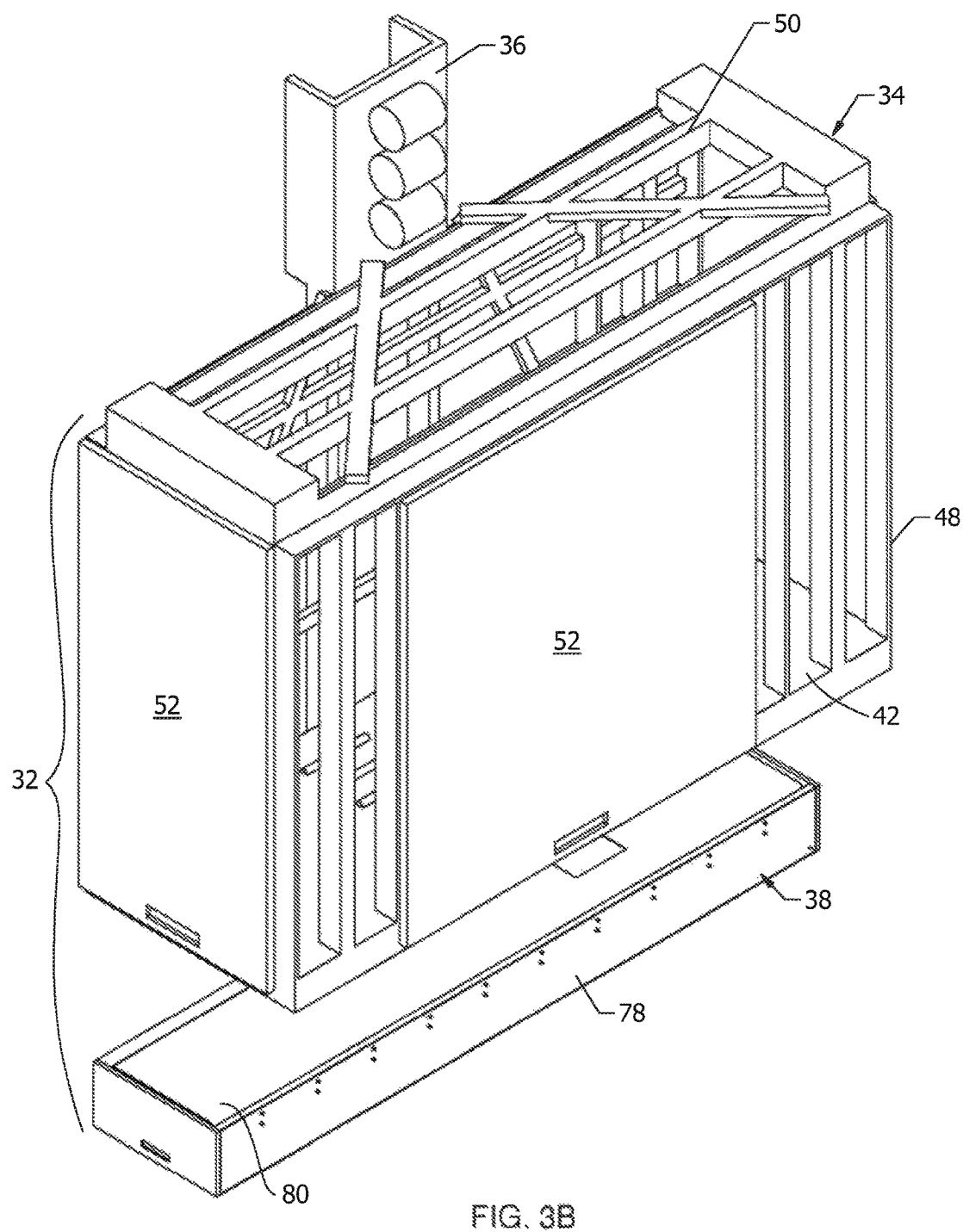
FIG. 3B is an exploded view of the car assembly, drawn at a larger scale.

As can be seen in FIG. 3B, it is preferred that the conveyor subassembly 38 is mounted on a bottom side 40 of the housing subassembly 34 (FIG. 1B). As can also be seen in FIGS. 3H, 6A, and 6B, the housing subassembly 34 preferably includes a floor portion 42 that has a hole 44 therein and a housing roller conveyor 46 positioned proximal to the hole 44. It is also preferred that the housing subassembly 34 includes walls 48 and a roof portion 50 (only partially shown in FIGS. 3B and 3H). (It will be understood that the roof 50 is omitted from FIGS. 6A and 6B for clarity of illustration.) The walls 48 preferably include one or more doors 52, to permit egress from and ingress into an interior cavity 54 generally defined by the floor portion 42, the walls 48, and the roof portion 50. In one embodiment, the housing roller conveyor 46 preferably includes power rollers 55, i.e., the rollers 55 preferably are self-rotating. Alternatively, however, the rollers 55 may be idlers, i.e., not powered or self-rotating.

It will be understood that, in one embodiment, the walls 48 and the roof portion 50 preferably include coverings that substantially enclose the interior cavity 54. It will also be understood that portions of the walls 48 and the roof 50 are omitted for clarity of illustration. Preferably, the interior cavity 54 is sufficiently large that the bin assembly 30 is receivable therein, as well as one or more workers 56. As will be described, the housing subassembly 34 preferably includes elements that make the interior cavity 54 comfortable and safe for the workers that ride in the interior cavity 54.

Figure 6B:
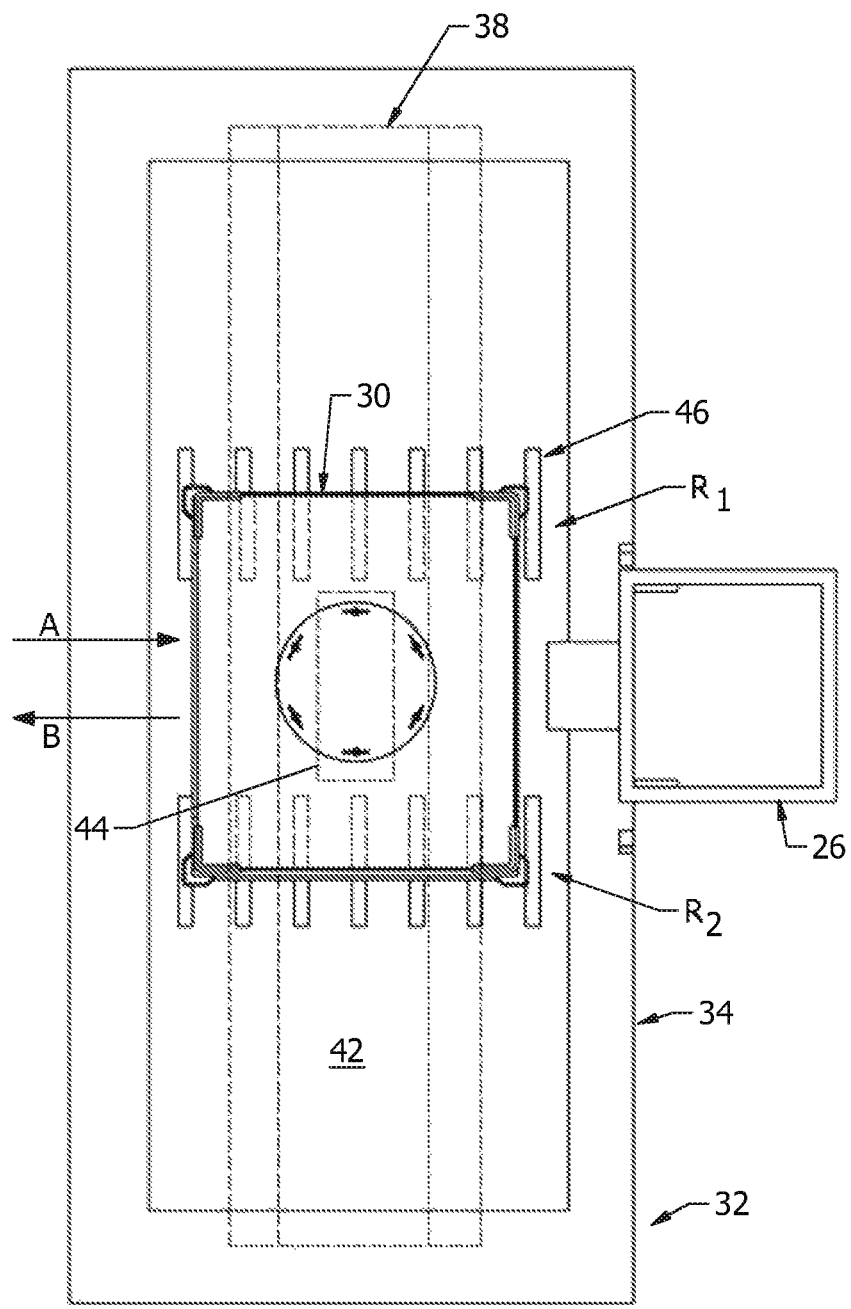
FIG. 6B is a top view of the car assembly of FIG. 6A with the bin assembly positioned therein in a discharge position and the conveyor subassembly in a retracted position.
Figure 6C:
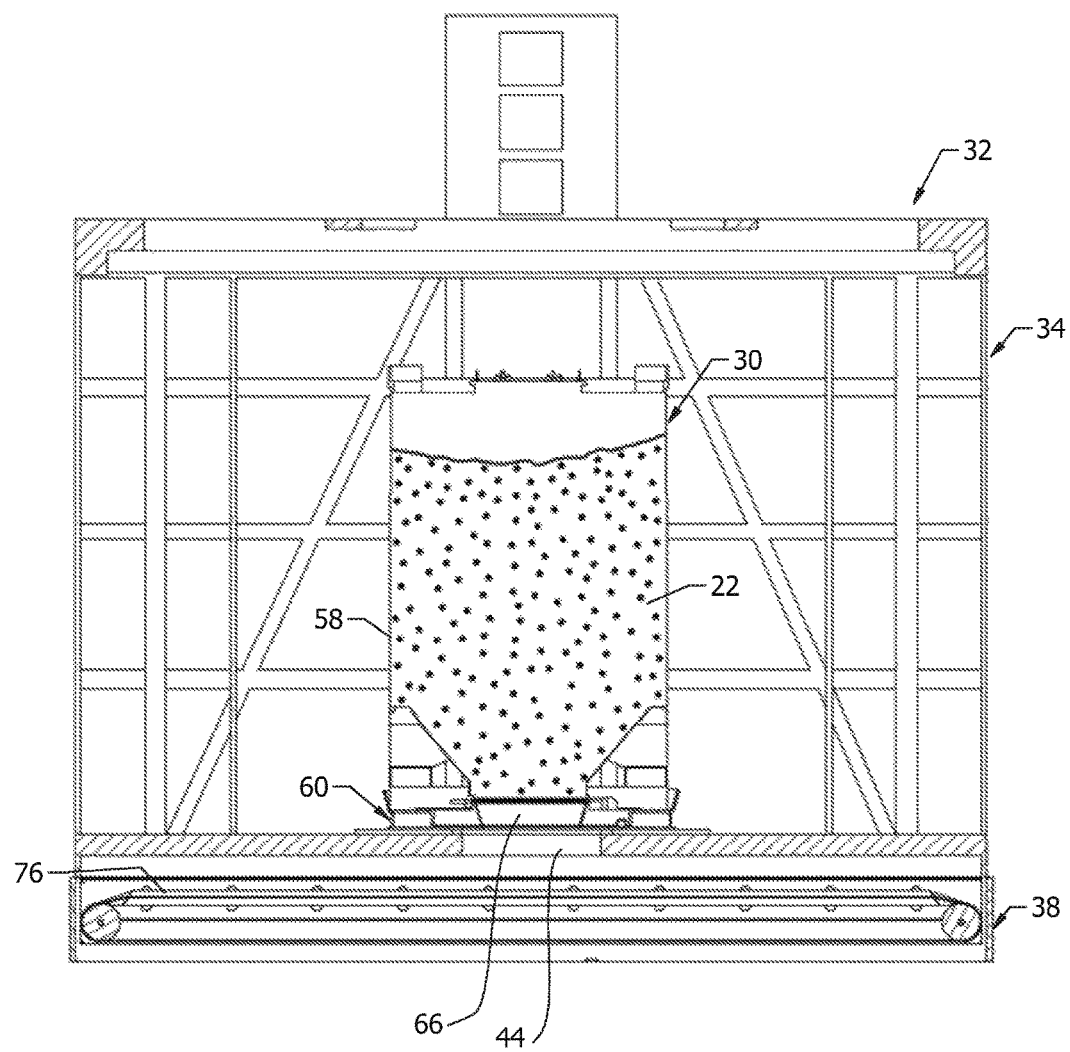
FIG. 6C is a side view of the car assembly and the bin assembly of FIG. 6B including a partial cross-section thereof.

In FIG. 6B, the bin assembly 30 is shown in its discharge position inside the housing subassembly 34. As can be seen in FIG. 6B, when the bin assembly 30 is in its discharge position, it is substantially centered over the hole 44, to facilitate the discharge of the payload 22 from the bin assembly 30 through the hole 44.

As can be seen in FIG. 6A, in one embodiment, the hole 44 preferably is substantially centrally located in the floor portion 42. It is also preferred that the rollers 55 of the housing roller conveyor 46 are arranged in two parallel rows "R₁" and "R₂" on either side of the hole 44. The rows "R₁" and "R₂" of rollers 55 preferably are positioned beside the hole 44, to move the bin assembly into and out of its discharge position.

Figure 3C:
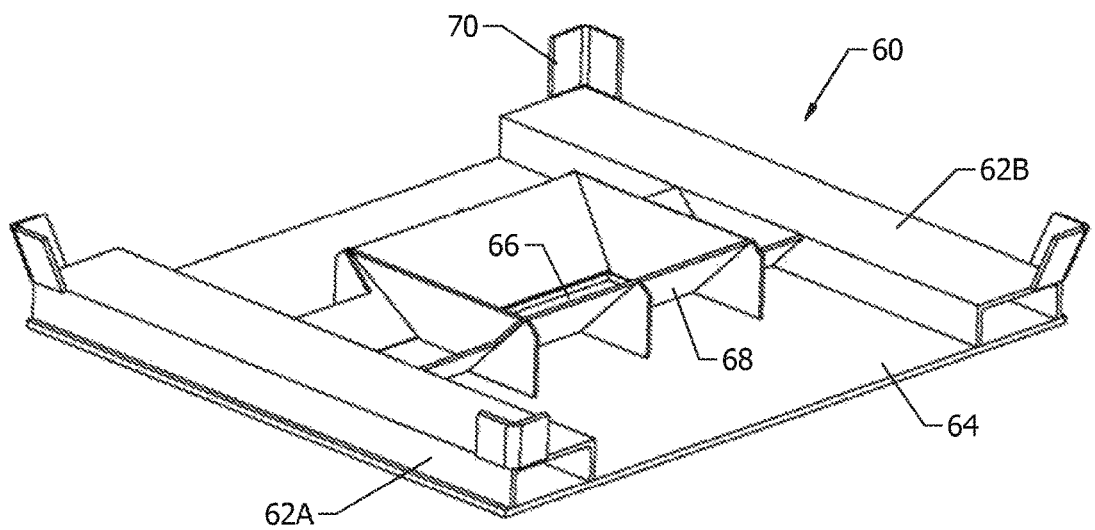
FIG. 3C is an isometric view of an embodiment of a base pallet of the invention, drawn at a larger scale.
Figure 3D:
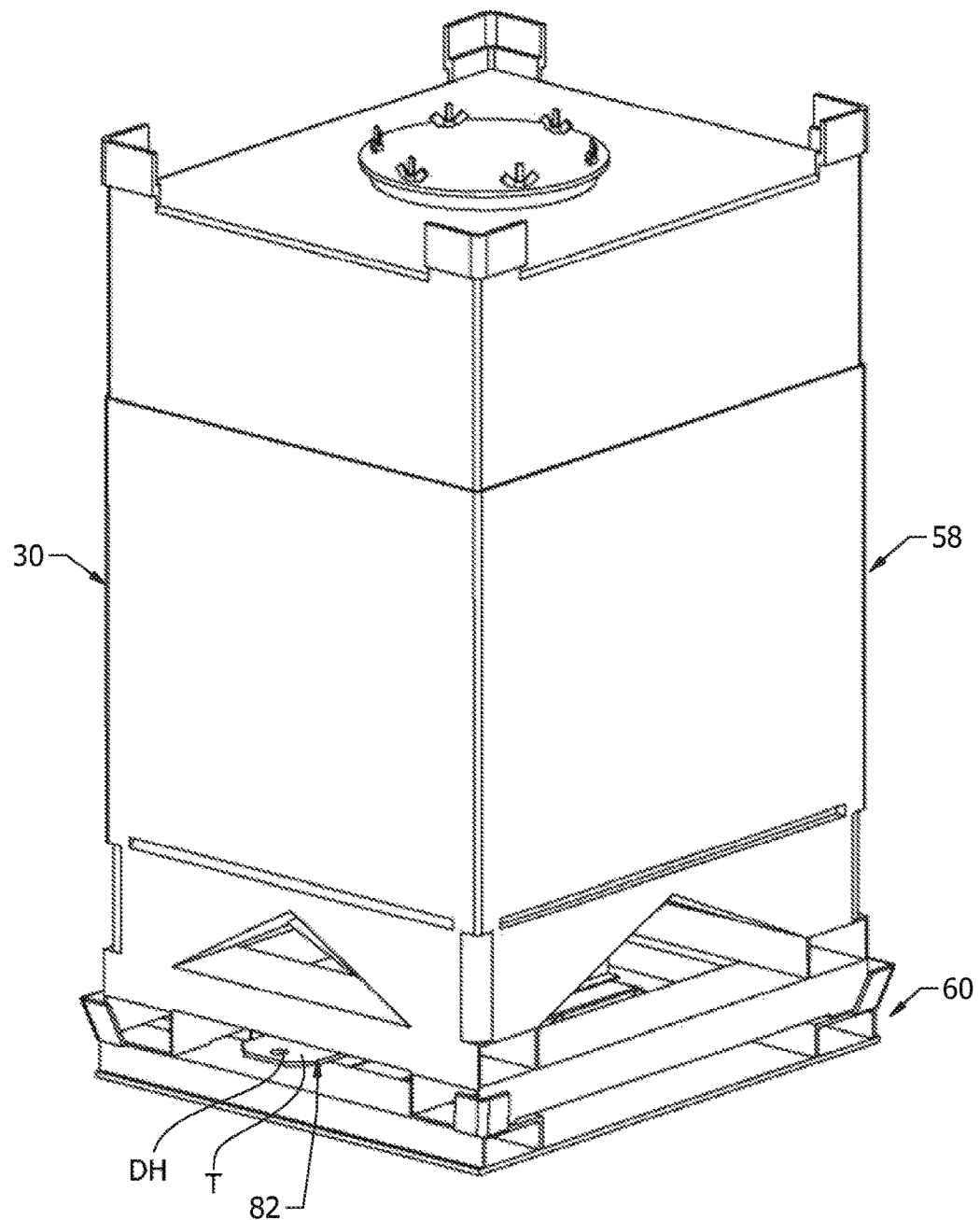
FIG. 3D is an isometric view of an embodiment of a bin assembly of the invention, drawn at a smaller scale.
Figure 3E:
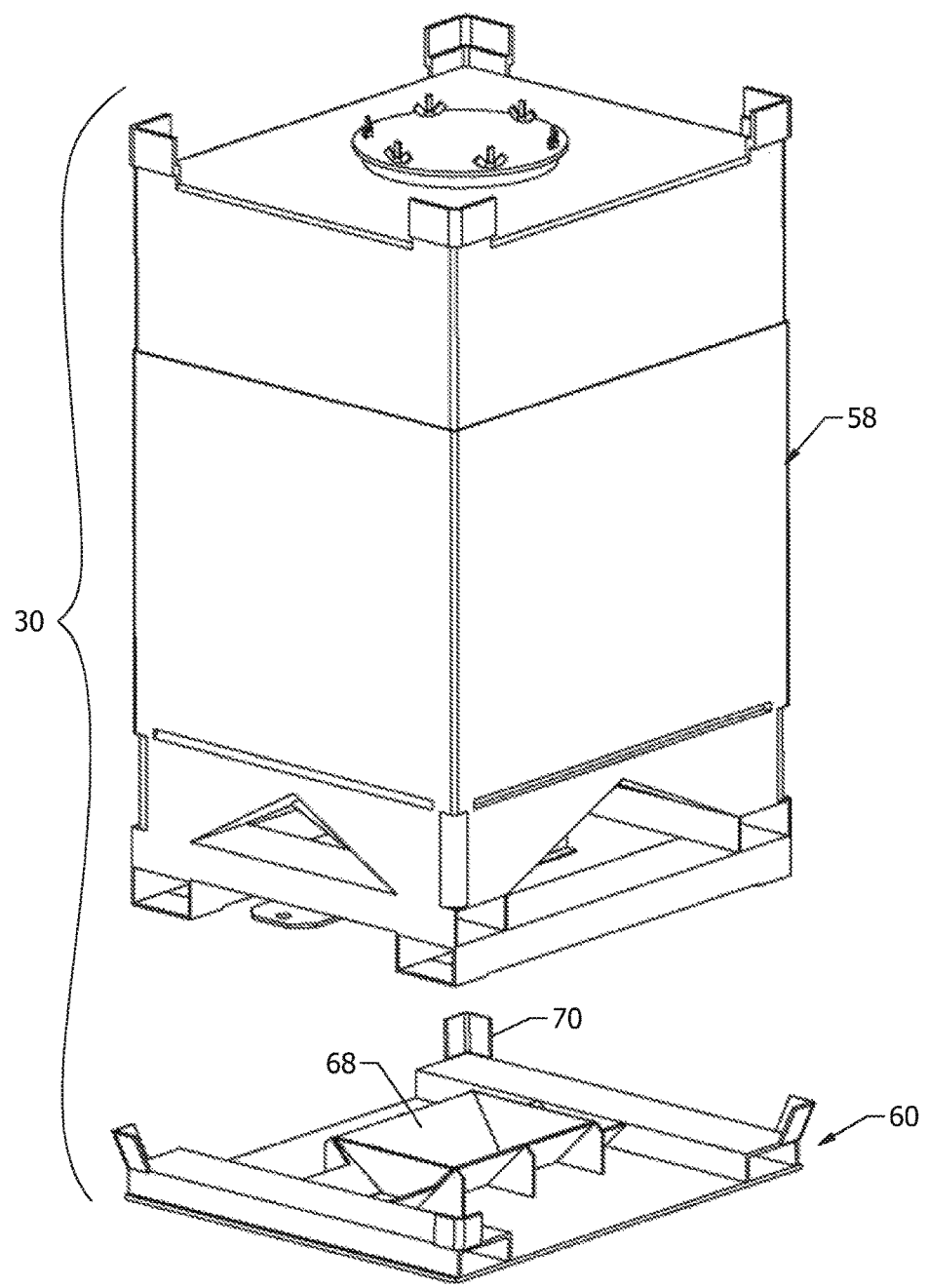
FIG. 3E is an exploded view of the bin assembly of FIG. 3D.
Figure 3F:
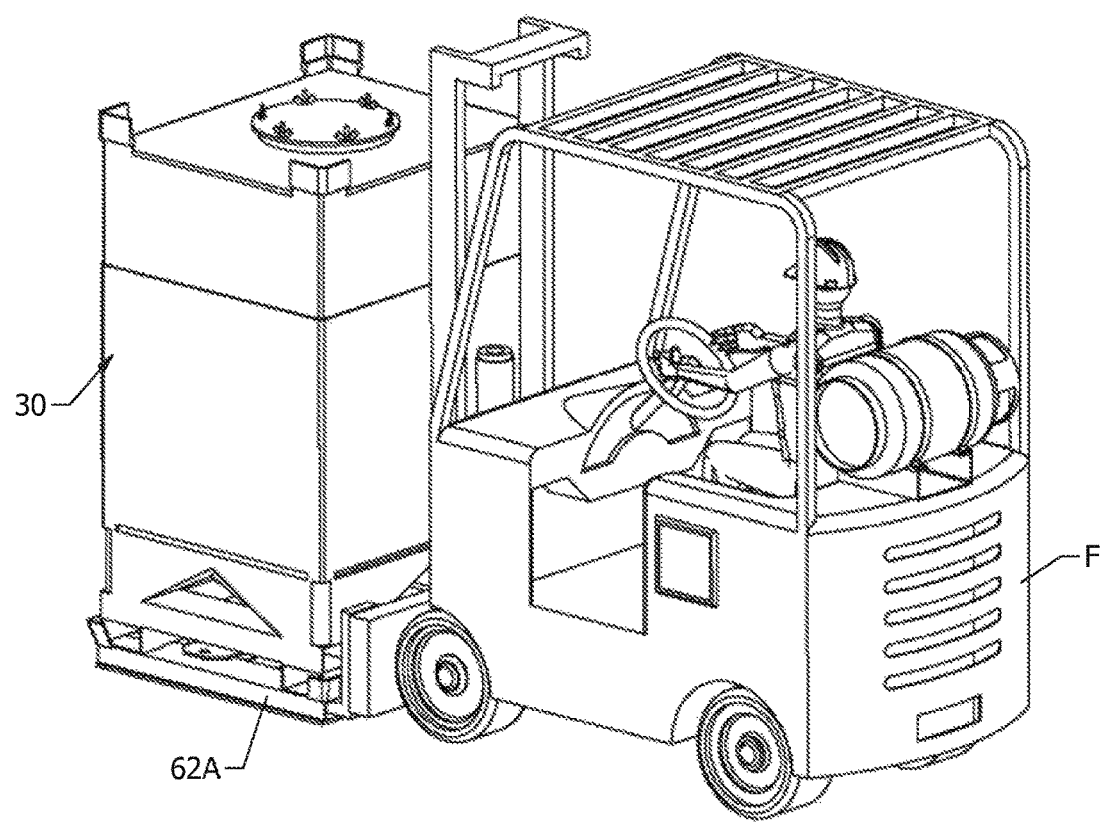
FIG. 3F is an isometric view of the bin assembly of FIG. 3D showing a forklift with forks thereof engaged therewith, drawn at a smaller scale.

It would be appreciated by those skilled in the art that the bin assembly 30 may be provided in various configurations. As can be seen in FIG. 3E, in one embodiment, the bin assembly 30 preferably includes a container 58 in which the payload (i.e., the particulate matter) 22 is receivable. It is preferred that the container 58 includes an opening 73 at a bottom end thereof (FIG. 7D) coverable by a movable gate 82 (FIG. 7C) that is movable between an open position (FIG. 7D), in which the opening 73 is at least partially unobstructed by the gate 82 to permit the payload to exit the container 58 under the influence of gravity through the opening 73, and a closed position (FIG. 7C), in which the opening 73 is substantially obstructed by the gate 82. As will be described, movement of the gate may be controlled in various ways.

As will also be described, the gate 82 preferably is in the closed position thereof while the loaded bin assembly 30 is moved into the housing subassembly 34, and located in the discharge position therein (i.e., above the hole 44). Preferably, the gate 82 is not opened, even in part, until the car assembly 32 is in its discharge position, and the conveyor subassembly 38 is in the extended condition. In those circumstances, the worker will cause the gate 82 to be moved to the open position, or to a partially open position, when appropriate. Control of the opened (or partially opened) gate is to be closely monitored by the worker.

Figure 4A:
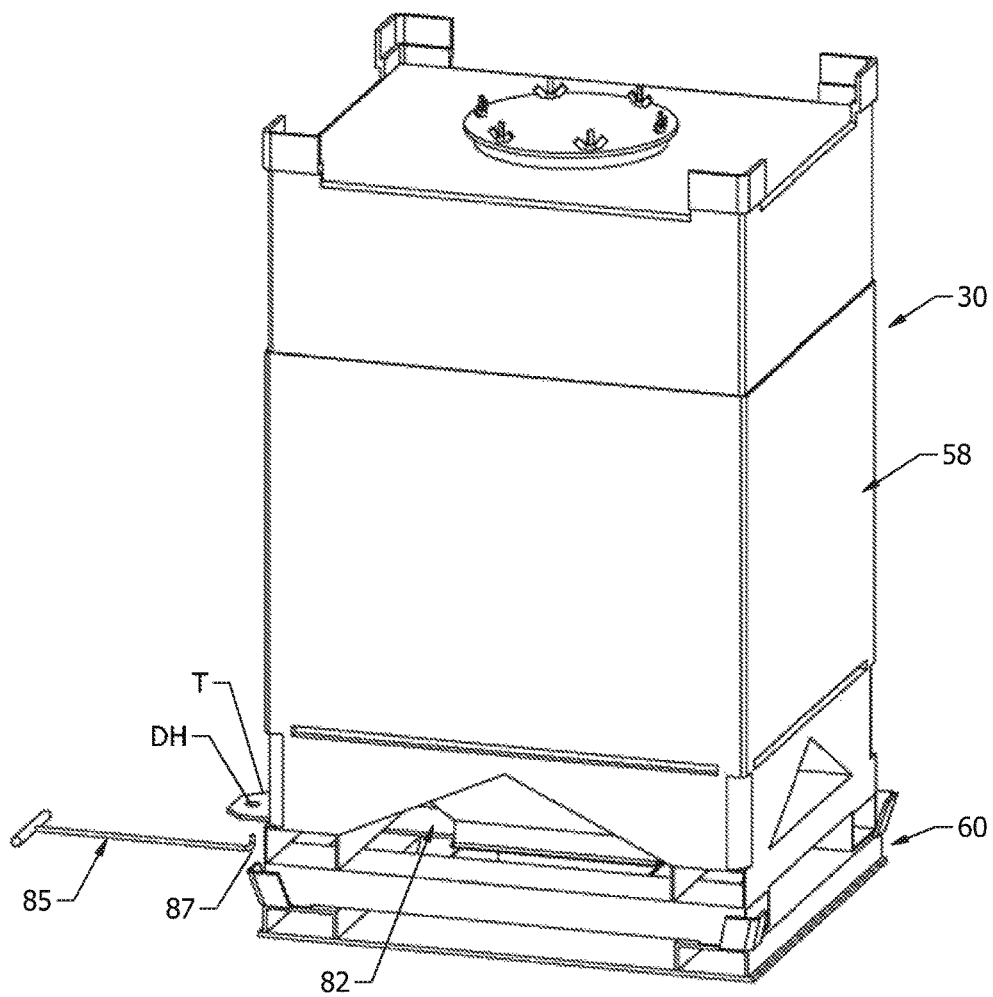
FIG. 4A is an isometric view of the bin assembly of FIG. 3D with a handle for moving a discharge gate thereof, drawn at a larger scale.

It is also preferred that the bin assembly 30 includes a base pallet 60. Preferably, and as can be seen in FIG. 3C, the base pallet 60 includes a base plate 64 including an aperture 66 that is at least partially alignable with the opening 73 in the container 58, when the container 58 is positioned on the base pallet 60 (FIGS. 3D, 3E, 4A). Also, the base pallet 60 preferably includes a gate control device 85 (FIG. 4A) for moving the gate 82 between the closed and open positions thereof.

It is also preferred that the base pallet 60 additionally includes a funnel 68 formed to direct the payload into the aperture 66 (FIG. 3D). Preferably, the base pallet 60 also includes one or more receptacle guide elements 70 with which at least a part of the container 58 is engageable, for locating the container 58 in a predetermined position on the base pallet 60.

As will be described, it is also preferred that the gate control device 85 includes an engagement element 87 engageable with the gate 82 when the container 58 is positioned on the base pallet 60, to move the gate 82 between the open and the closed positions thereof.

For instance, in one embodiment illustrated in FIG. 4A, the gate control device 85 preferably is an elongate handle, and the engagement element 87 preferably is a hook portion of the handle that is attachable to the gate 82. Once temporarily attached to the gate, the handle 87 may be manually pulled by the worker (not shown in FIG. 4A) to move the gate 82 to the open or partially open position, and also pushed to move the gate toward its closed position. However, as will be described, in other embodiments, the gate control device 85 preferably is energized by hydraulics, or by electrical energy, or compressed air, or other suitable energizing means.

In the embodiment illustrated in FIG. 4A, the discharge gate 82 preferably includes a tab portion "T" with a hole "DH" therein in which the engagement element 87 is receivable. Once the gate control device 85 is so engaged with the gate, the worker can manually position the gate 82, as desired. As will be described, the base pallet may alternatively include other means for controlling movement and positioning of the gate 82.

Those skilled in the art would appreciate that the base pallet 60 has the advantage that it can engage with rollers (i.e., in a roller conveyor) while moving in any substantially horizontal direction.

Preferably, and as can be seen in FIG. 3C, the base pallet 60 includes sleeves 62A, 62B, mounted on a base plate 64 which has an aperture 66 therein. In one embodiment, the base pallet 60 preferably includes four of the guide elements 70 (i.e., one at each corner). The guide elements 70 serve to hold the container 58 relatively securely on the base pallet 60 so that the opening 73 of the container hopper 72 is substantially vertically aligned with the base hopper 68 and the aperture 66. Due to such vertical alignment, the payload 22 exits the bin assembly 30 relatively quickly when it is discharged from the container 58, as will be described.

The guide elements 70 preferably hold the container 58 relatively securely in position on the base pallet 60 so that the container 58 does not move relative to the base pallet 60 when the bin assembly 30 is moved. However, once the container 58 is emptied, it may be separated from the base pallet and returned to the catalyst manufacturer or supplier (or, in the case of other particulate matter, the supplier of such other particulate matter), for refilling.

Figure 3G:
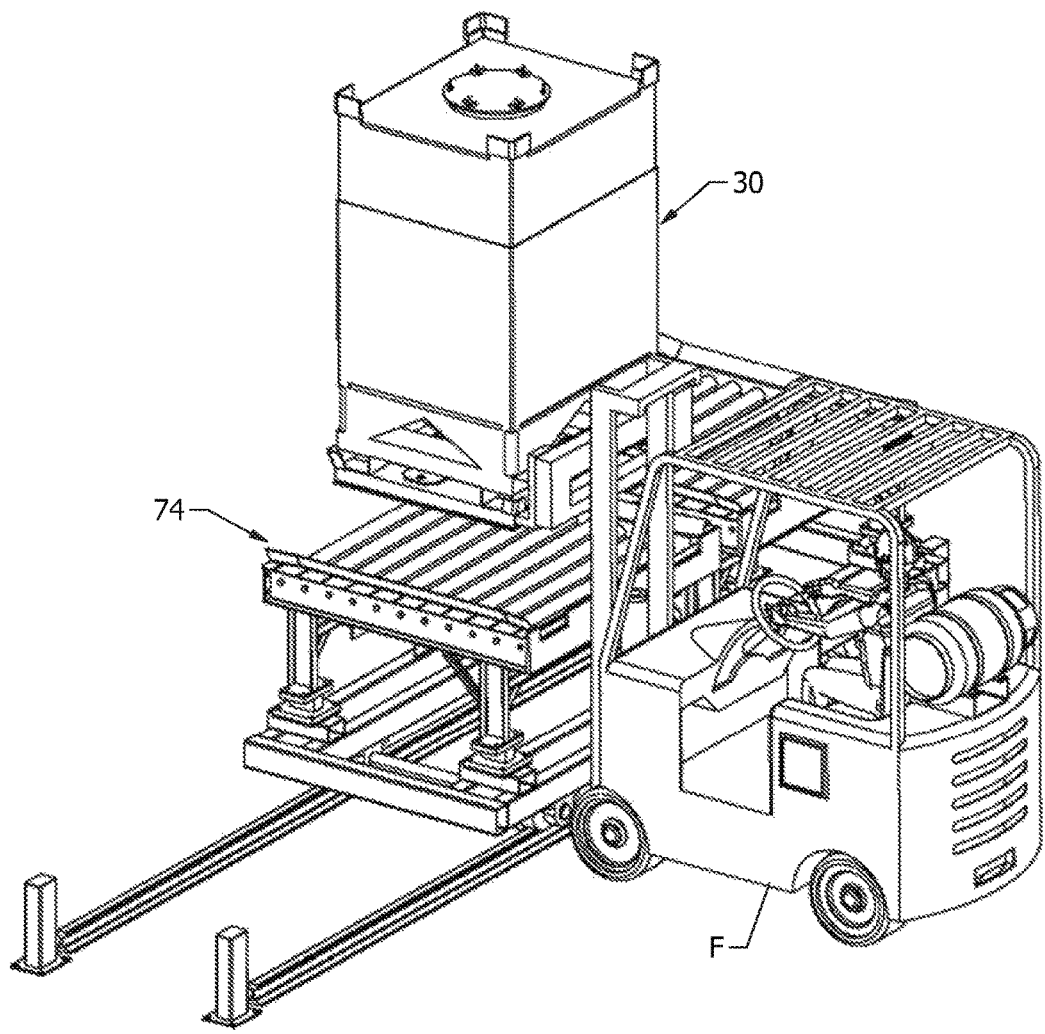
FIG. 3G is an isometric view of the bin assembly being positioned on a carriage subassembly of the transfer assembly of FIG. 3A, drawn at a larger scale.
Figure 3H:
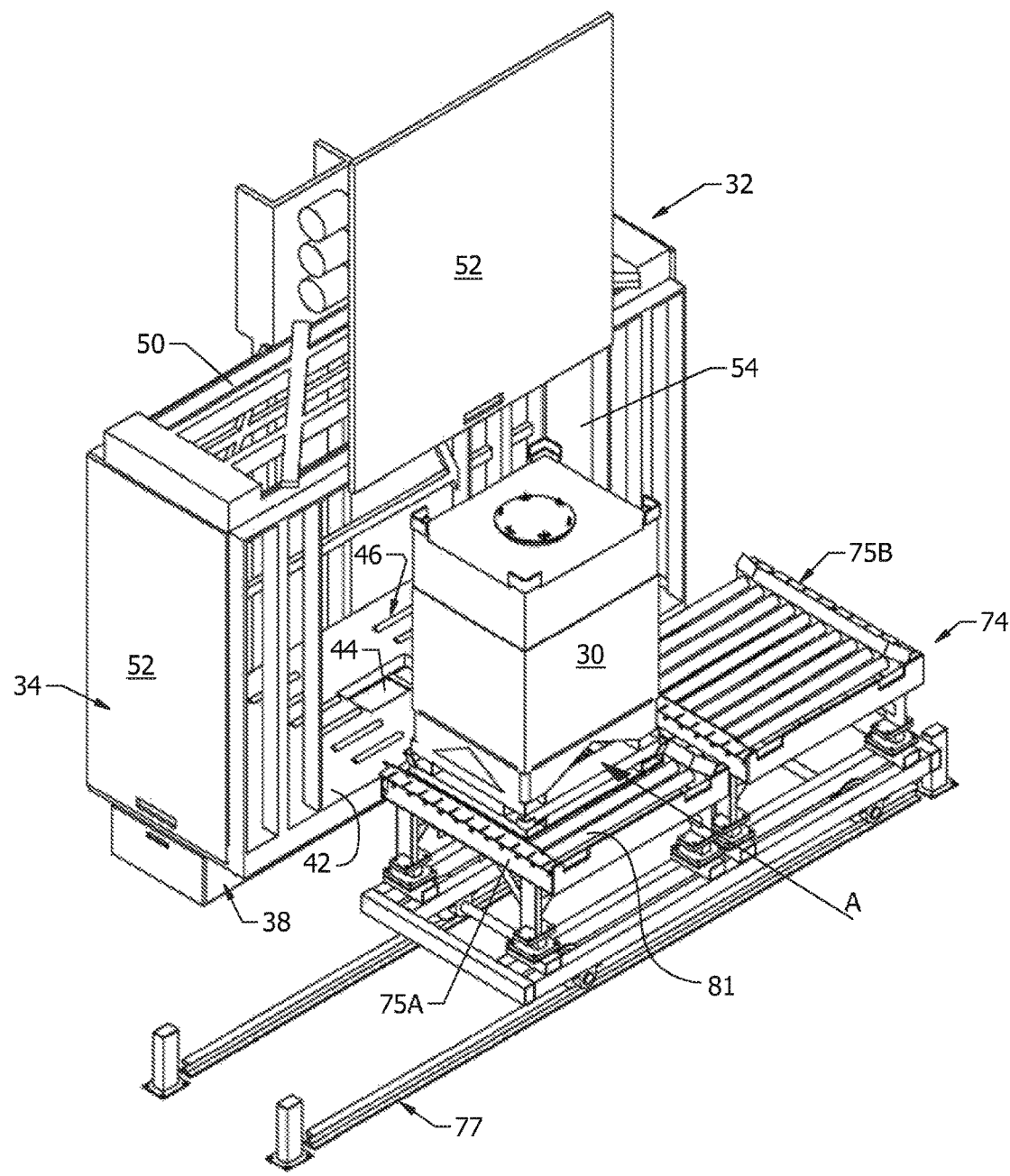
FIG. 3H is an isometric view of the bin assembly positioned on the carriage subassembly of FIG. 3G, ready to be loaded into the car assembly drawn at a smaller scale.

The loaded bin assembly 30 preferably is moved initially using any suitable means. As can be seen, for instance, in FIG. 3F, a forklift or tow motor "F" preferably engages the bin assembly 30 by sliding forks thereof into the sleeves 62A, 62B, in conventional manner. The forklift "F" with the bin assembly 30 engaged therewith via the forks moves to a transfer assembly 74 (FIG. 3G). The system 20 preferably includes the transfer assembly 74. In one embodiment, the transfer assembly 74 preferably is located adjacent to the housing subassembly 34 when the car assembly 32 is positioned at the ground position (FIGS. 3A, 3H). As illustrated in FIG. 3H, the tow motor "F" sets the loaded bin assembly 30 (i.e., the bin assembly 30 with the payload 22 therein) on the transfer assembly 74, so that the loaded bin assembly 30 can then be moved into the housing subassembly 34.

In one embodiment, the transfer assembly preferably includes one or more carriage subassemblies 75 and a carriage track 77 on which the carriage subassembly 75 is movable (FIGS. 10A-10D), for movement of the carriage subassembly 75 between a loading position (FIG. 1C), in which the carriage subassembly 75 is located to at least partially move the bin assembly 30 into the housing subassembly 34, and an unloading position (FIG. 1D), in which the carriage subassembly 75 is located to at least partially move the bin assembly 30 out of the housing subassembly 34. From the foregoing, it can be seen that the loading and unloading positions of the carriage subassemblies are determined relative to the housing subassembly 34, when the car assembly 32 is at its ground position.

It is also preferred that the transfer assembly 74 includes a frame 79. Preferably, each of the carriage subassemblies 75 is mounted on the frame 79 and includes one or more transfer devices 81 engageable with the bin assembly 30 and configured to move the bin assembly 30 relative to the frame 79 when the bin assembly 30 is engaged by the transfer device 81, upon activation of the transfer device 81.

It is preferred that the carriage track 77 includes two parallel rails "$N_1$", "$N_2$" (FIG. 10D) of conventional construction (FIGS. 1C, 1D, 3G, 3H, 10D). It is also preferred that the transfer assembly 75 includes two carriage subassemblies, identified in FIGS. 1C, 1D, and 3H as 75A and 75B for clarity of illustration. The frame 79 preferably also includes wheels "W" that are formed for rolling engagement with the rails "$N_1$", "$N_2$". Movement of the frame 79 on the track 77 may be effected by any suitable means. For instance, in one embodiment, the frame 79 and the carriage subassemblies 75A, 75B mounted thereon preferably are moved between the loading position and the unloading position by motive means mounted on the frame 79. Alternatively, the carriage subassemblies and the frame may be manually moved on the track.

Those skilled in the art would be aware of various mechanisms that may be used to move the bin assembly 30 relative to the frame 79 of the carriage subassembly 75. In one embodiment, for example, it is preferred that the transfer device 81 is a roller conveyor (FIGS. 1C, 1D). Preferably, a number of the rollers in the roller conveyor are self-rotating, so that the roller conveyor 81 can, when activated, move the bin assembly 30 positioned on it. Those skilled in the art would appreciate that, alternatively, the rollers may be idlers (i.e., not powered or self-rotating), and the bin assembly 30 may simply be manually moved by one or more workers (not shown) into or out of the housing subassembly 34.

It is also preferred that the carriage subassembly 75 includes one or more load cells 83 (FIG. 10C), for weighing the bin assembly 30 when the bin assembly 30 is positioned on the carriage subassembly 75. As will be described, because the load cells are mounted on the frames 79 of the respective carriage subassemblies 75A, 75B, the weights of the individual payloads that are delivered to the reactor vessel "V" can be quickly and accurately determined.

As can be seen in FIGS. 1C, 1D, and 3A, the carriage subassembly 75A preferably is configured to move a loaded bin assembly 30 in the direction indicated by arrow "A" in FIG. 1D, and the carriage subassembly 75B preferably is configured to move an unloaded bin assembly 30 in the direction indicated by arrow "B" in FIG. 1C. It will be understood that, in FIGS. 1C and 1D, the bin assembly 30 is shown in its discharge position in the housing subassembly 34 for clarity of illustration. In FIG. 1C, the bin assembly 30, loaded with the payload 22, is shown after it has been moved from the carriage subassembly 75A into the housing subassembly 34. In FIG. 1D, the bin assembly 30, after the payload 22 has been discharged from it, is to be moved out of the housing subassembly 34, over the carriage subassembly 75B.

It will be understood that, during production, the emptied or unloaded bin assembly 30 (i.e., one from which the payload 22 has been discharged) should first be removed from the housing subassembly 34, i.e., when the car assembly 32 is returned to the ground position (FIG. 1C) from the raised position (FIG. 1A). To achieve this, the carriage subassembly 75B is initially located in the unloading position (FIG. 1C). After the unloaded bin assembly 30 is removed from the housing subassembly 34 by the forklift "F", the carriage subassemblies 75A, 75B preferably are moved so that the carriage subassembly 75A is in the loading position (FIG. 1D). It will be understood that the emptied bin assembly is removed using the forklift "F" in conventional manner.

In order to load the loaded bin assembly 30 (i.e., one in which the payload is loaded) into the car assembly 32, in one embodiment, the forklift "F" positions the loaded bin assembly 30 on the carriage subassembly 75A (FIG. 3G). (It will be understood that the car assembly 32 is omitted from FIG. 3G for clarity of illustration.) It is preferred that the carriage subassembly 75A is in the loading position when the loaded bin assembly 30 is positioned on the carriage subassembly 75A by the forklift "F". As indicated in FIG. 3H, the loaded bin assembly 30 is then moved in the direction indicated by arrow "A" over the rollers 81 on the carriage subassembly 75A into the interior cavity 54 of the housing subassembly 34, assisted by the housing roller conveyor 46 mounted in the floor 42 of the housing subassembly 34. It will be understood that, once the loaded bin assembly 30 is inside the interior cavity 54, the loaded bin assembly 30 is positioned on the floor 42 so that the opening 66 in the base plate 64 is substantially aligned with the opening 44 in the floor 42, i.e., the bin assembly 30 is located in its discharge position in the housing subassembly 34 (FIGS. 6B, 6C, 7A, 7B).

From the foregoing, it can be seen that the transfer devices 81, alone, move the bin assembly 30 only partly into or out of the housing subassembly 34. For instance, the loaded bin assembly 30 is moved over the transfer device 81 in the direction indicated by arrow "A" in FIG. 1C initially. Once the housing roller conveyor 46 is partly engaged by the bin assembly 30 (i.e., as the bin assembly 30 enters the cavity 54), the rollers 55 of the housing roller conveyor 46 are then used to move the bin assembly 30 further into the cavity 54, to stop ultimately when the bin assembly 30 is in its discharge position inside the housing subassembly 34 (FIGS. 6B, 6C). Similarly, after the payload 22 has been discharged from the container 58 and the car assembly 32 is at its ground position, the initial movement of the unloaded bin assembly 30 from its discharge position is due to its engagement with the housing roller conveyor 46. The unloaded bin assembly 30 engages the transfer device 81 of the second carriage subassembly 75B when the unloaded bin assembly 30 is partially out of the housing subassembly 34.

The transfer assembly 74 preferably is included in the system 20 in order to protect the car assembly 32 from possible damage due to the operation of the forklift "F". Those skilled in the art would appreciate that, if the forklift engaged and disengaged the bin assemblies while they are positioned in the housing subassembly, the forklift might engage the housing subassembly (directly or indirectly) with sufficient force to damage the car assembly, or to dislodge the car assembly 32 from the track 26. In one embodiment, therefore, the transfer assembly 74 is preferred because it provides for safe loading and unloading of the bin assemblies. This is because the transfer assembly 74 requires the forklift "F" to position the loaded bin assembly and to engage the emptied bin assembly at a distance from the car assembly 32. Therefore, the transfer assembly 74 is preferred for safety reasons. However, it would also be appreciated by those skilled in the art that the forklift may be prevented from engaging the car assembly directly or indirectly, and potentially pushing the car assembly off the track, by other means. For instance, in the absence of the transfer assembly 74, a stop element (not shown) may be provided, to prevent the forklift from coming closer to the car assembly 32 than a predetermined distance, thereby preventing direct or indirect engagement of the forklift "F" with the car assembly 32.

Once the loaded bin assembly 30 is positioned inside the car assembly 32, the car assembly 32 is moved along the track 28 from the ground position to the raised position thereof (FIGS. 1A, 2B). As noted above, during such vertical movement, the conveyor subassembly 38 is in the retracted condition thereof.

As noted above, in one embodiment, the housing subassembly 34 preferably includes the housing roller conveyor 46 for moving the bin assembly to its discharge position (FIG. 6B) in the housing subassembly 34, in which the payload 22 is dischargeable from the bin assembly 30 under the influence of gravity. The housing roller conveyor 46 preferably is also used to move the bin assembly 30 at least partially out of the housing subassembly 34 after the payload 22 has been discharged. The housing subassembly 34 preferably also includes the floor portion 42, which includes the hole 44 therein through which the payload 22 is dischargeable when the bin assembly 30 is located in the discharge position (FIGS. 6C, 7E). For clarity of illustration, in FIG. 6B, the direction of movement of the bin assembly 30 into the housing assembly 34 to the discharge position is indicated by arrow "A", and the direction of movement of the bin assembly 30 out of the housing subassembly 34 after the payload has been discharged is indicated by arrow "B".

Preferably, the conveyor subassembly 38 preferably is movable between the retracted condition (FIGS. 6A-6C), in which the conveyor subassembly 38 is positioned to permit travel of the car assembly 32 along the substantially vertical track 28, and the extended condition (FIGS. 2B, 7A-8), in which the conveyor subassembly 38 is positioned to transfer the payload loaded onto the conveyor subassembly 38 through the hole 44 substantially transversely relative to the track 28.

Figure 7A:
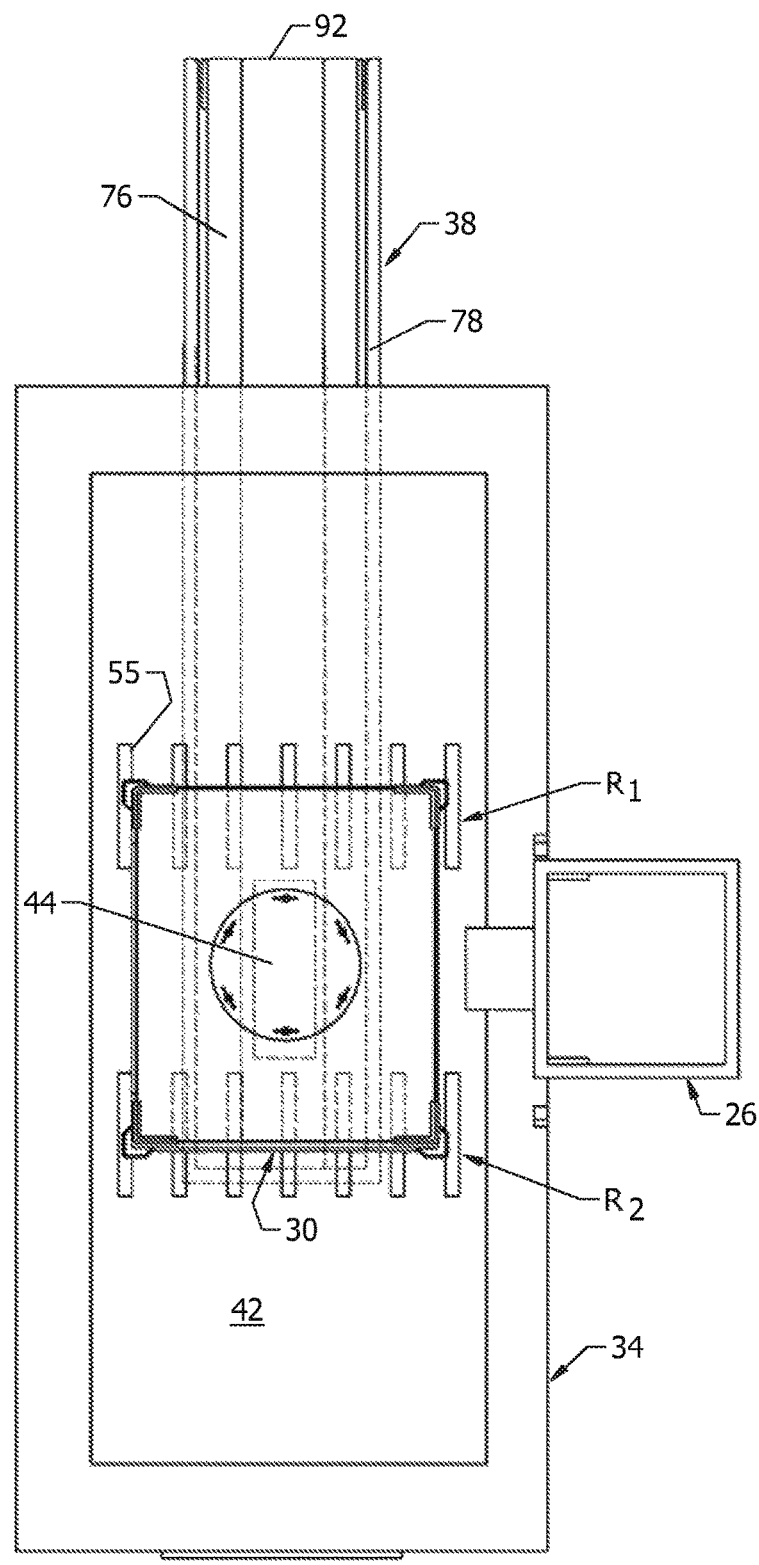
FIG. 7A is a top view of the car assembly of FIG. 6B, with the bin assembly positioned therein and the conveyor subassembly in an extended position.

As can be seen, for example, in FIGS. 6C and 7A, the conveyor subassembly 38 preferably includes a conveyor belt 76 and a conveyor body portion 78 supporting the conveyor belt 76 and elements driving the conveyor belt. In one embodiment, it is also preferred that the conveyor subassembly 38 includes a shroud 80 (FIG. 7B) partially covering the conveyor belt 76, as will be described. (It will be understood that the shroud 80 is omitted from FIG. 7A for clarity of illustration.)

As noted above, the bin assembly 30 preferably includes the discharge gate 82, for controlling flow of the payload from the container portion 58 into the base hopper 68. This control, which (as would be appreciated by those skilled in the art) may be effected manually or via electronic, hydraulic, or other controls, is preferred because it enables the worker 56 to control the flow of payload onto the conveyor belt 76 based on visual evidence of the flow of the payload toward the vessel "V". As will be described, control of the rate of discharge of the particulate matter of the payload onto the conveyor subassembly 38 is important, in order to minimize the risk of spilling and wasting the particulate matter.

Figure 2A:
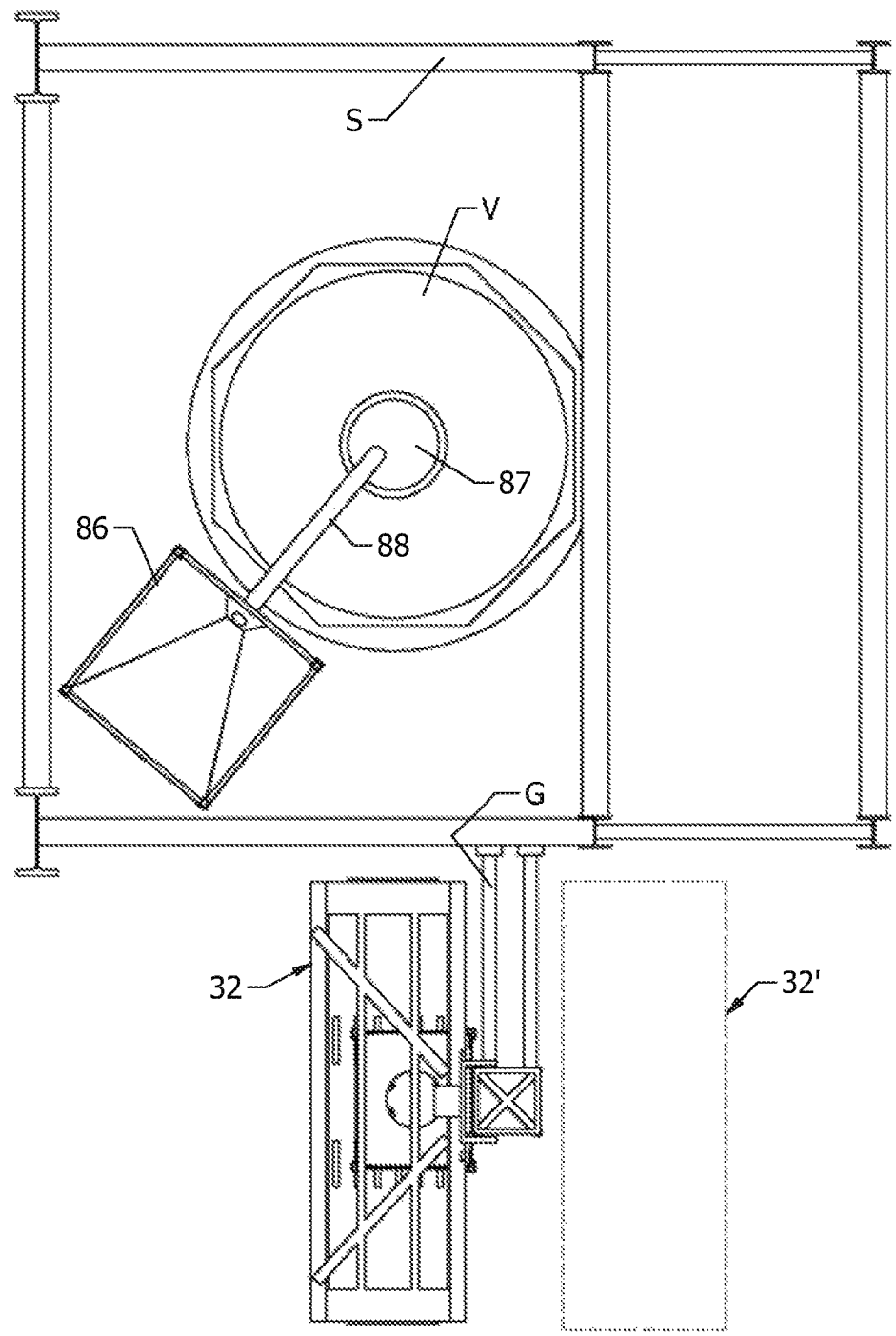
FIG. 2A is a top view of the system of FIG. 1A including the reactor, showing the car assembly mounted on the track at an intermediate position thereon.
Figure 2B:
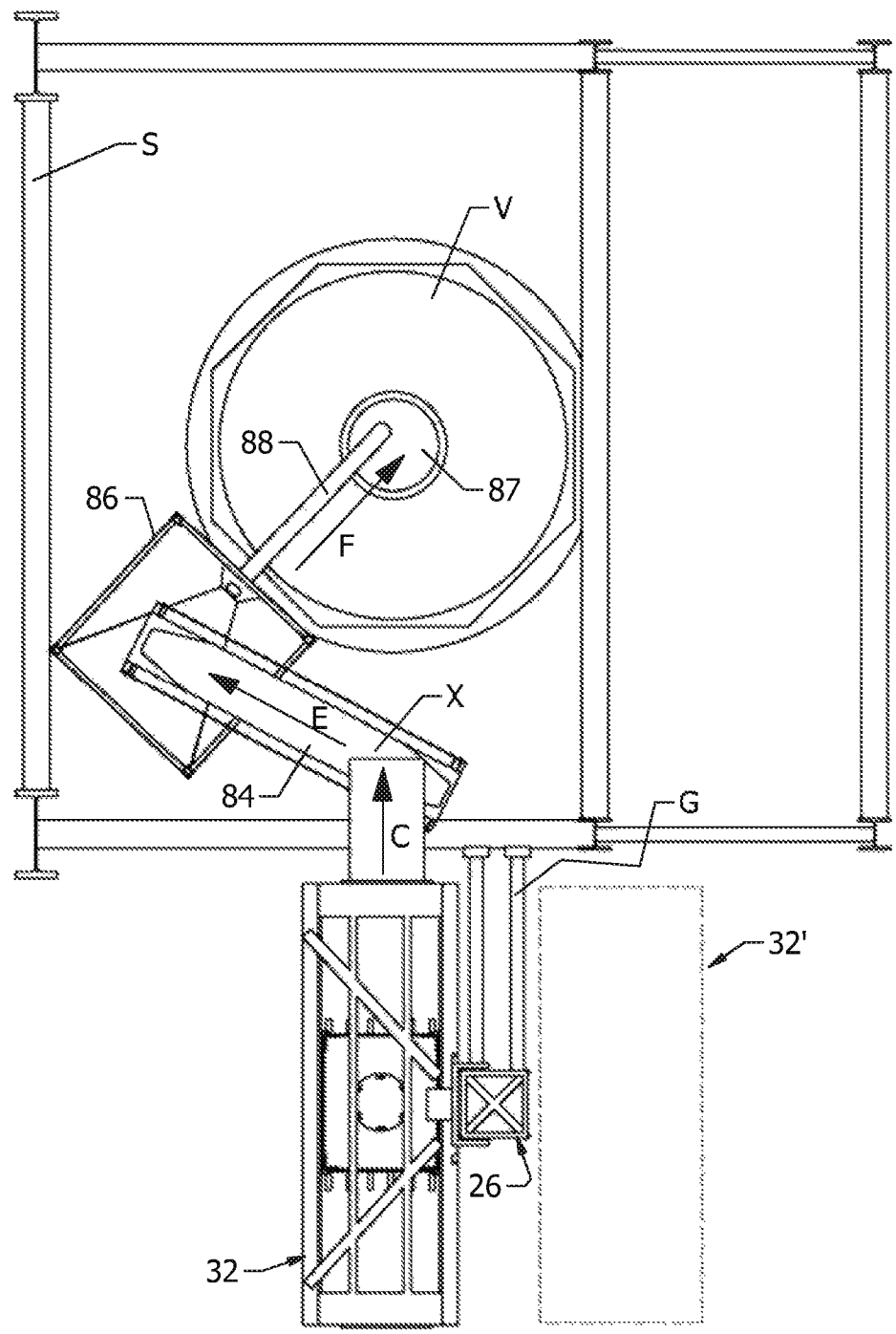
FIG. 2B is a top view of the system of FIG. 1A including a cross-section of the reactor, showing the car assembly mounted on the track in a discharge position.

Those skilled in the art would appreciate that the preselected release location "X", at which the payload is released from the car assembly 32, may be determined based on various parameters. In the example illustrated, the structure "S" preferably includes an intermediate conveyor 84 positioned to convey the payload into an intermediate bin or loader 86 which is positioned to direct material therein into the vessel "V". Preferably, the loader 86 is located at a top end of the vessel "V" (FIGS. 1A, 2B). As can be seen in FIGS. 2A and 2B, the vessel "V" preferably has an opening 87 at its top end. Preferably, material flowing from the intermediate bin 86 is directed through a discharge tube 88 into the vessel "V" via the opening 87. As can be seen in FIG. 1A, it is preferred that the intermediate conveyor 84, the intermediate bin 86, and the opening 87 at the top of the vessel "V" are all enclosed within an enclosure structure 90, to protect such components and the materials therein from atmospheric conditions.

As can be seen in FIG. 2B, once the car assembly 32 is in its raised, or discharge position, the conveyor subassembly 38 is moved to its extended condition. In the embodiment of the invention illustrated in FIG. 2B, the preselected release location is at an outer end 92 of the conveyor belt 76 when the conveyor subassembly 38 is in the extended condition (FIGS. 7A-7E). In FIG. 2B, the preselected release location is identified for clarity by the reference letter "X".

As can be seen in FIG. 6C, when the loaded bin assembly 30 is in the discharge position in the housing subassembly 34, the payload 22 is prevented from falling downwardly through the hole 44 in the floor portion 42 only by the gate 82, which is shown in the closed position in FIG. 6C. In FIG. 6C, the conveyor subassembly 38 is shown in its retracted position, to permit vertical travel of the car assembly 32.

Figure 7B:
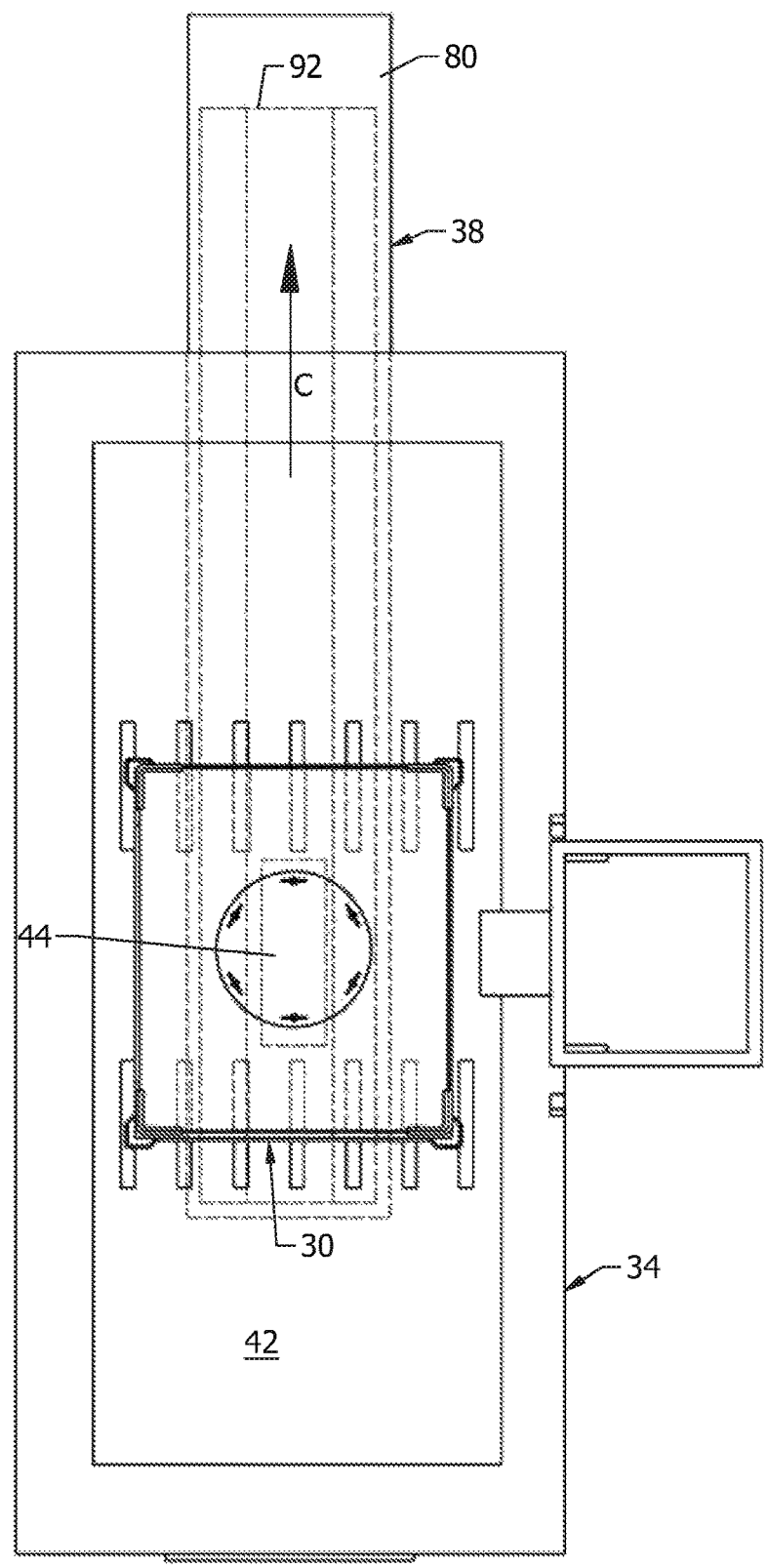
FIG. 7B is a top view of the car assembly of FIG. 7A showing the conveyor subassembly in the extended position and with a shroud thereon.

As described above, once the car assembly 32 reaches its raised or discharge position (shown in FIG. 1A) at which the payload is to be discharged and released into the reactor vessel "V", the conveyor subassembly 38 is moved to its extended condition. It will be understood that, when the conveyor subassembly 38 is in its extended condition, the outer end 92 preferably is located inside the enclosure structure 90. For instance, a wall of the enclosure structure 90 may have a small flap covering a small hole (not shown) in its wall that may be pushed open by the conveyor subassembly 38 when it is moved to the extended condition (FIG. 7B).

Figure 7C:
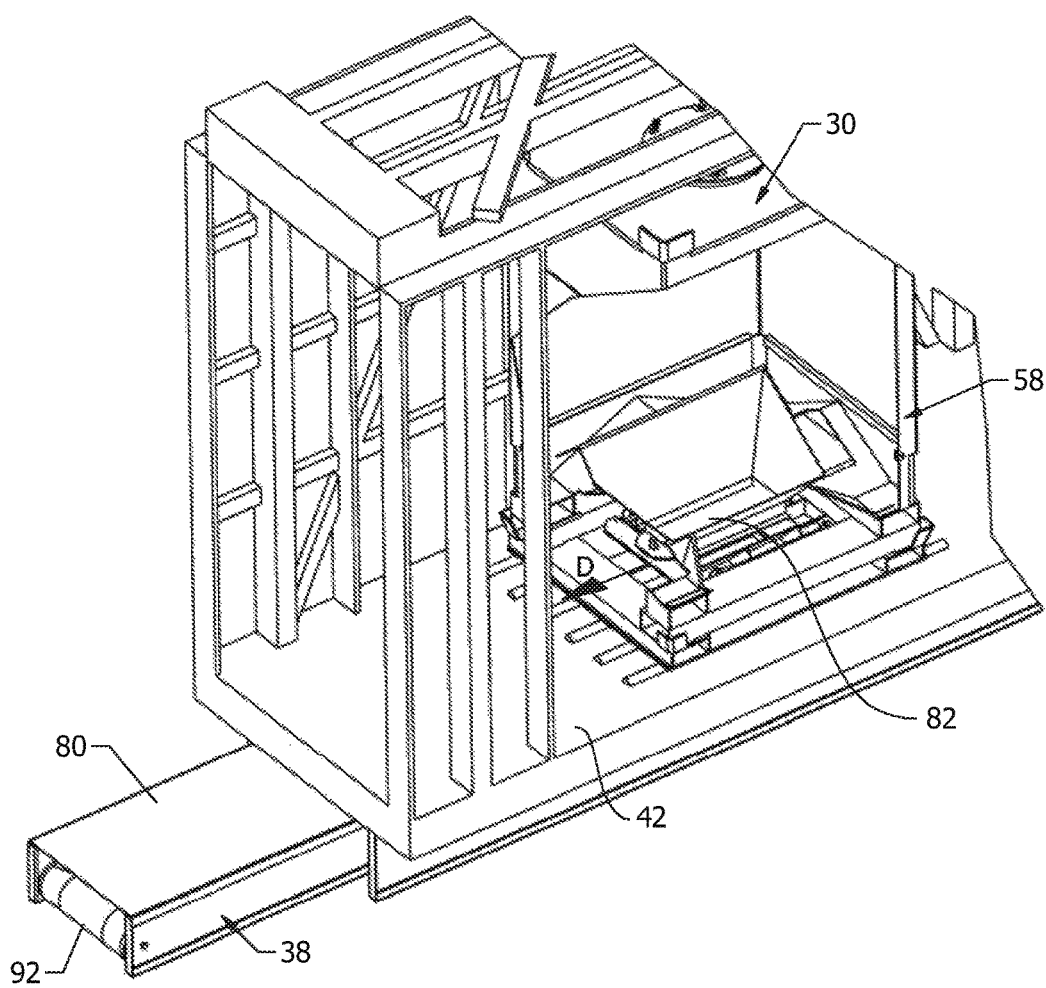
FIG. 7C is an isometric view of the car assembly and the bin assembly of FIG. 7B, partially cut away and omitting the payload in which the gate is closed, drawn at a larger scale.
Figure 7D:
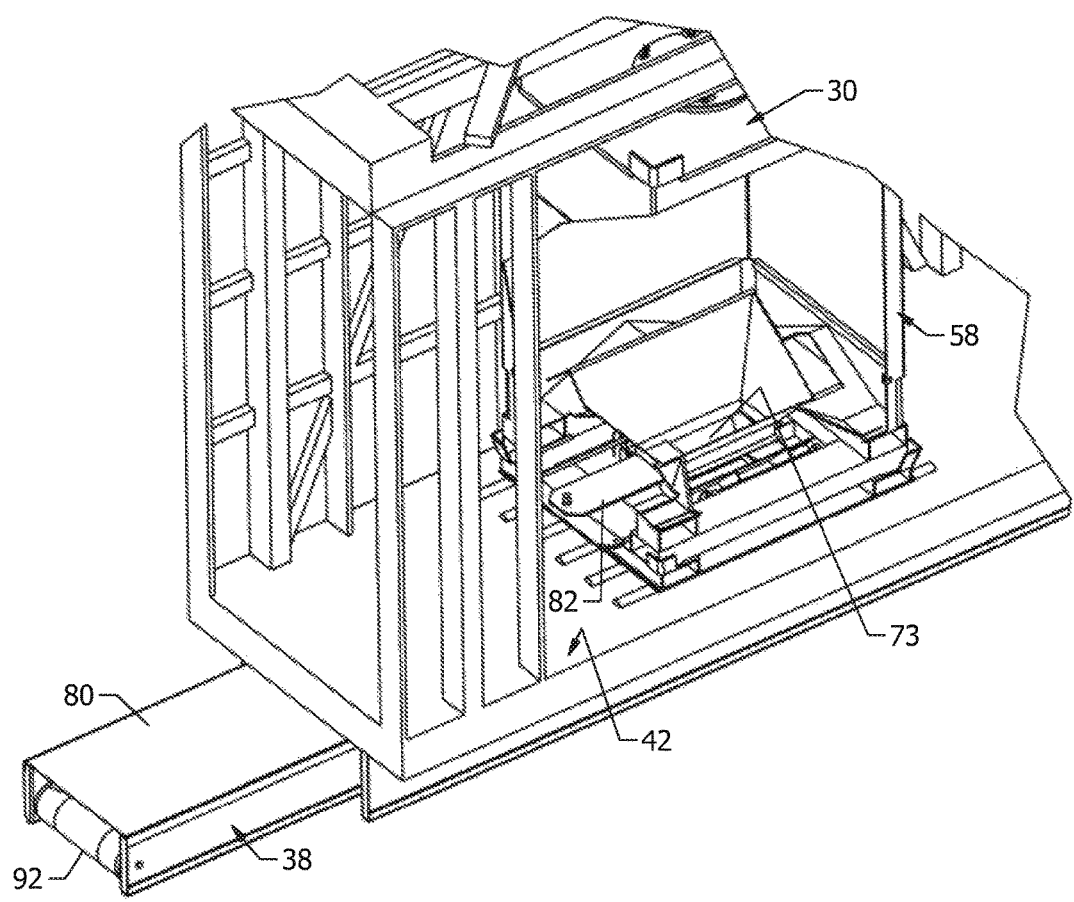
FIG. 7D is an isometric view of the car assembly and the bin assembly of FIG. 7C, partially cut away and omitting the payload in which the gate is open.
Figure 7E:
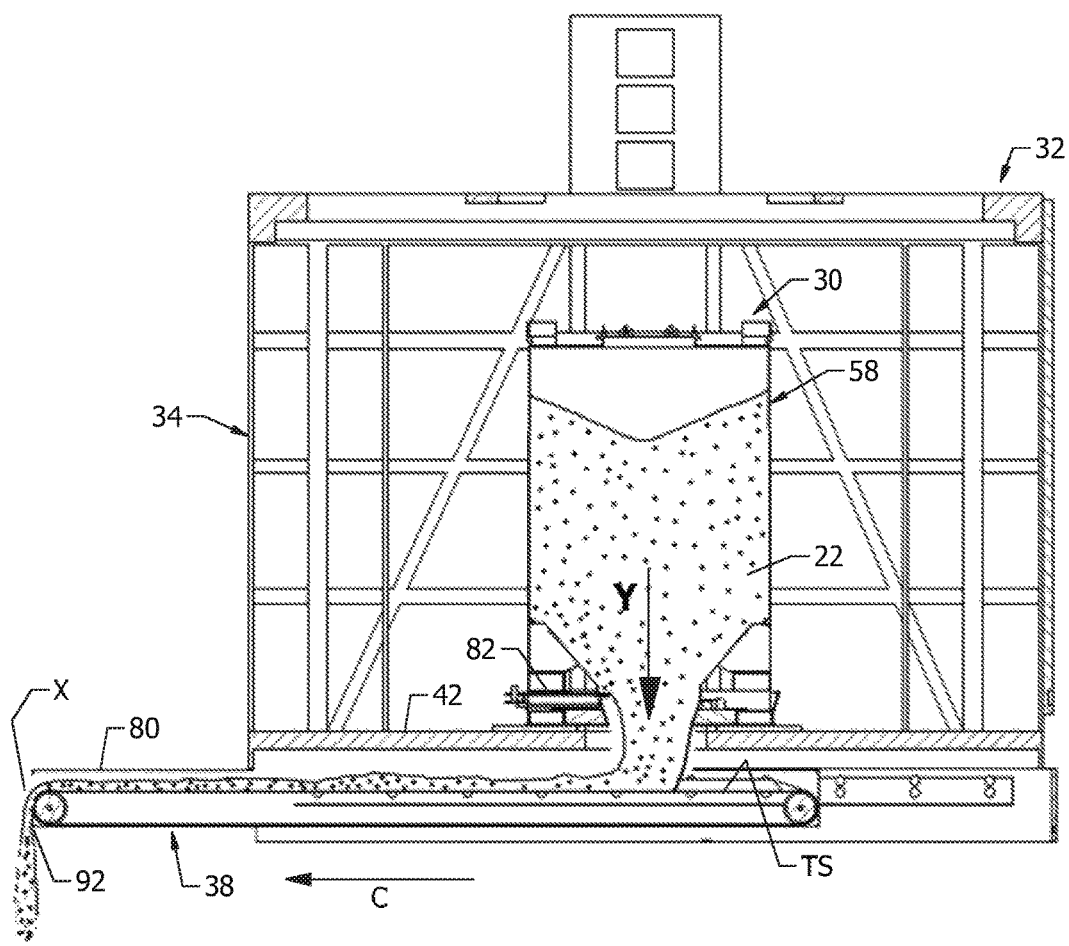
FIG. 7E is a side view of the car assembly and the bin assembly of FIG. 7B in which the gate is open, the payload is being discharged from the container under the influence of gravity, and the conveyor subassembly is conveying the payload transversely, drawn at a smaller scale.
Figure 8:
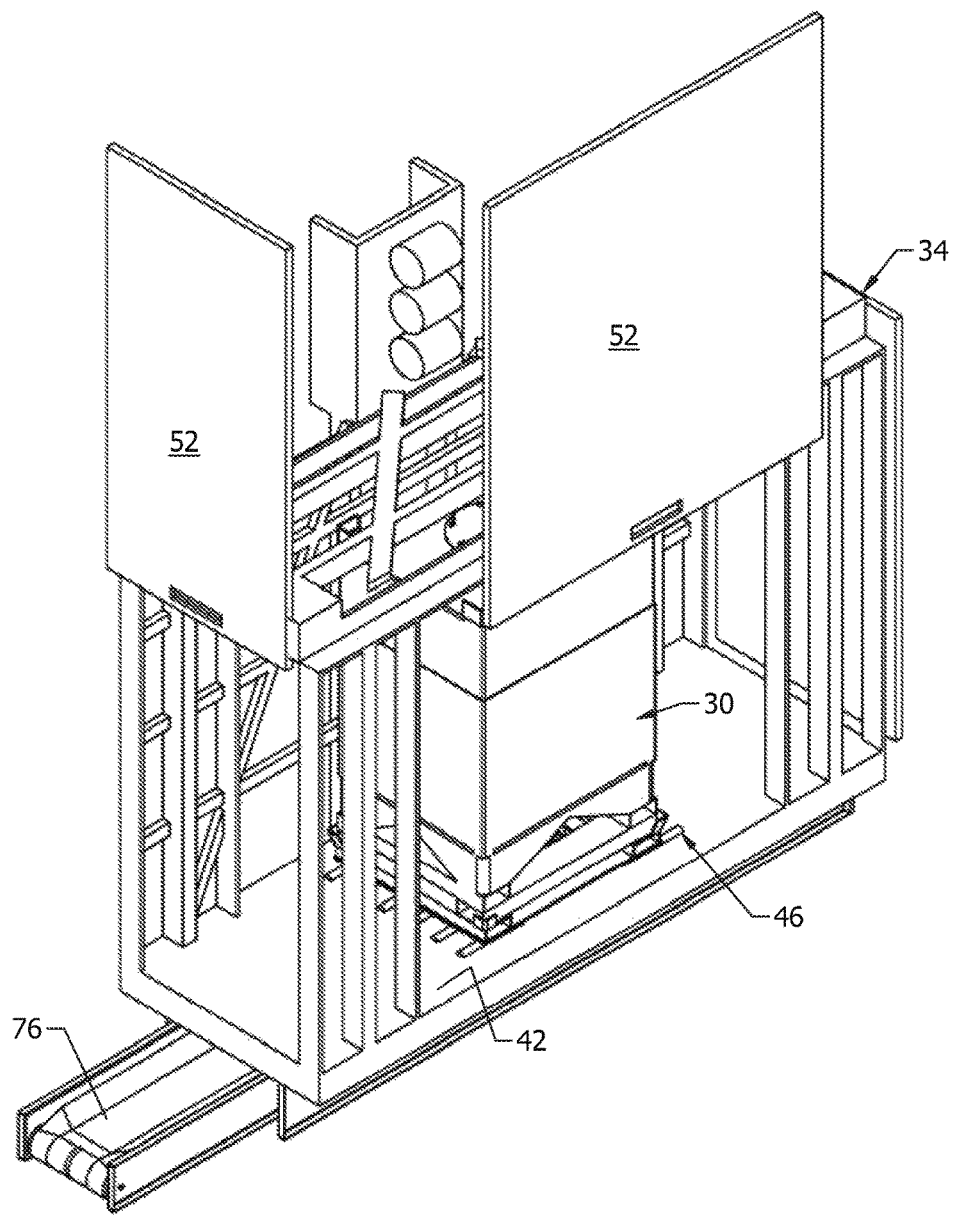
FIG. 8 is an isometric view of the car assembly with the bin assembly therein and the conveyor in the extended position, drawn at a smaller scale.

In FIGS. 7C and 7D, the gate 82 in the bin assembly 30 is shown in isometric views in which parts of the bin assembly 30 and the payload 22 are omitted, for clarity of illustration. In FIG. 7C, the gate 82 is shown in its closed position. It will be understood that, once the car assembly 32 is in its raised position, the gate 82 preferably remains in its closed position until (i) the conveyor subassembly 38 is in its extended condition, and (ii) the conveyor is activated, so that the top surface "TS" of the conveyor belt 76 (FIG. 7E) is moving in the direction indicated by arrow "C" (FIGS. 2B, 7B, 7E). Accordingly, once these conditions are satisfied, the gate 82 is moved to its open position, illustrated in FIGS. 7D and 7E. The gate 82 is moved in the direction indicated by arrow "D" in FIG. 7C from its closed to its open position by the gate control device 85.

Upon the gate 82 moving to its open position (FIG. 7D), the material 22 in the container 58 exits therefrom substantially downwardly, under the influence of gravity, onto the conveyor belt 76, as indicated by arrow "Y" in FIG. 7E. After passing through the opening 73 at the bottom of the container 58, the material 22 falls through the hole 44 in the floor portion 42 onto the top surface "TS" of the conveyor belt 76. The conveyor belt 76, with its top part moving in the direction indicated by arrow "C" in FIG. 2B and FIG. 7E, moves the payload 22 positioned thereon transversely from below the bin assembly 30 and the hole 44 to the preselected release location "X" (FIG. 7E). At the preselected release location "X", the material on the conveyor belt 76 falls off the conveyor belt 76.

As can be seen in FIG. 2B, the material 22 that is released from the end "X" of the conveyor 76 falls onto the intermediate conveyor 84, and is moved by the intermediate conveyor 84 to the interim bin 86. It will be appreciated by those skilled in the art that the upper surface of the intermediate conveyor 84 moves the material that falls onto it in the direction indicated by arrow "E" in FIG. 2B to the intermediate bin 86 (FIG. 2B). Those skilled in the art would appreciate that the payload 22 which is dropped into the interim bin 86 is moved therefrom under the influence of gravity through the discharge tube 88 into the vessel "V", via the opening 87, as indicated by arrow "F" in FIG. 2B. It would also be appreciated by those skilled in the art that a valve (not shown) may be positioned on the discharge tube 88, if desired, in order to provide a further means for controlling the flow of the payload into the vessel "V".

Those skilled in the art would appreciate that many other arrangements, i.e., other than the arrangement of the various elements illustrated in FIG. 2B, are possible. For instance, if feasible, the vessel may be constructed and positioned in the structure supporting it so that the preselected release location is directly above a part of the vessel, thereby permitting delivery of the payload directly from the conveyor subassembly 38 into the vessel.

It will be understood that, due to the direct nature of the delivery of the payload 22 from the container 58 to the interim bin 86, and also because the part of the payload 22 in the interim bin 86 depends in part on the payload's flow out of the interim bin 86, the worker 56 preferably monitors the delivery of the payload 22, and in particular, the amount of the payload 22 in the interim bin 86 while the payload 22 exits the container 58. If it appears that the rate of discharge of the payload 22 from the bin 86 (or from the intermediate conveyor 84) has slowed or stopped, then the worker 56 preferably then adjusts the rate of discharge from the container 58 by adjusting the position of the gate 82 to obstruct part of the hole 44. As will be described, this may be done by the worker via any suitable means.

Figure 4B:
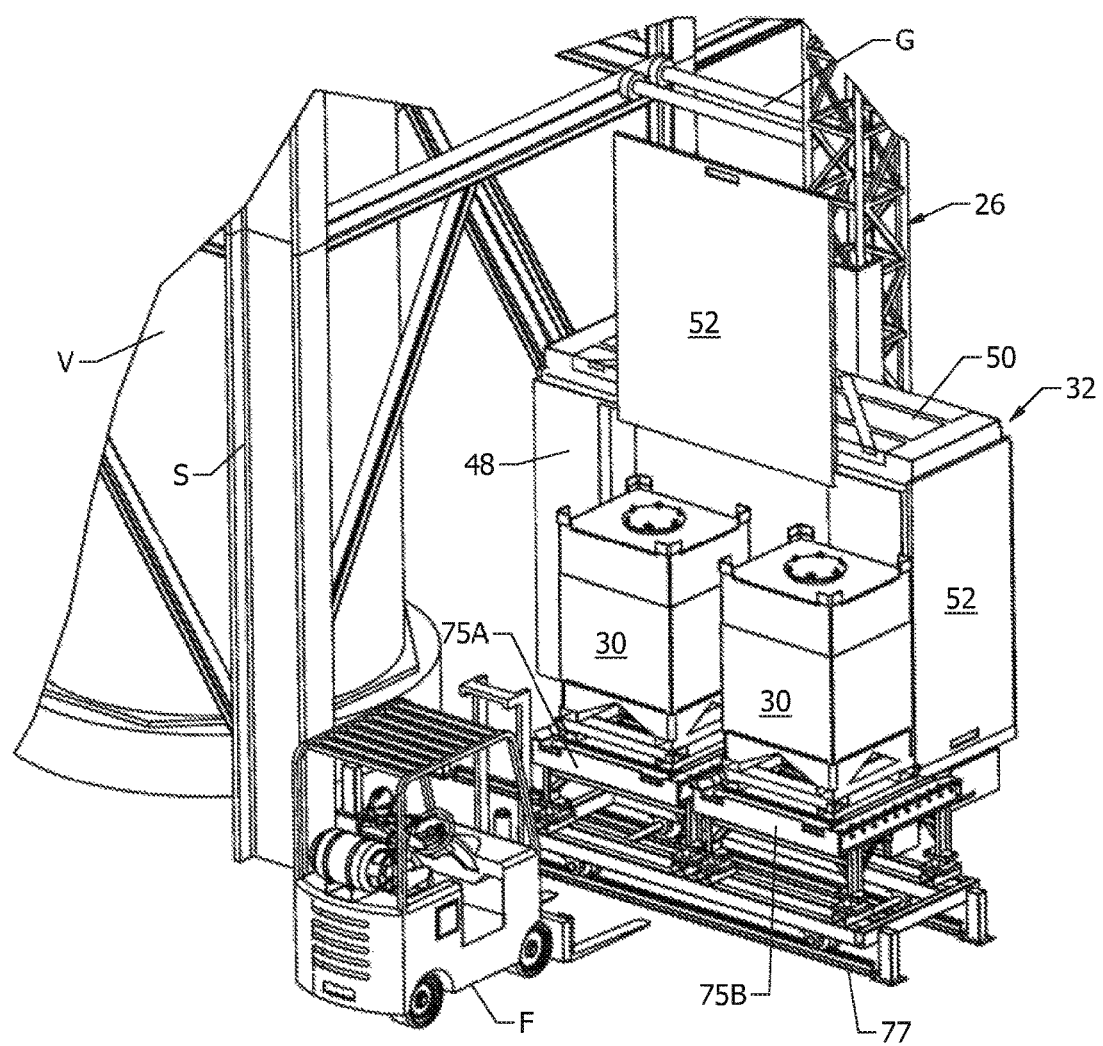
FIG. 4B is an isometric view of the transfer assembly with a loaded bin assembly and an emptied bin assembly positioned thereon, drawn at a smaller scale.

As can be seen, for instance, in FIGS. 1A and 4B, the interior cavity 54 of the housing subassembly 34 preferably is sufficiently large to accommodate one or two workers 56, in addition to the bin assembly 30. This is preferred for at least two reasons. First, it is convenient to have one worker 56 in the housing subassembly with the loaded bin assembly so that the worker 56 can control the discharge of the payload 22 from the bin assembly 30 onto the conveyor belt 76, making adjustments as needed, as described above.

The second reason to accommodate one or more workers in the housing subassembly 34 is that the car assembly 32 provides a convenient, rapid means of transportation from ground level to the top of the vessel. As is well known in the art, a significant amount of time may be spent by workers manually climbing up or down the structure "S", in the absence of an alternative vertical transportation means.

In FIG. 7A, for illustrative purposes, the conveyor subassembly 38 is shown in the extended condition, and the shroud 80 is omitted so that the belt 76 may be shown, for clarity of illustration. In FIG. 7B, the shroud 80 is included. (It will be understood that the roof 50 has been omitted from FIGS. 7A and 7B for clarity of illustration.) The shroud 80 substantially covers the part of the conveyor subassembly 38 that would otherwise be exposed when the conveyor subassembly 38 is in the extended position, except that the shroud 80 includes a hole underneath to permit the material to fall off the end of the conveyor belt clear of the conveyor subassembly 38. It will be understood that the shroud 80 is preferably included in the conveyor subassembly 38 in order to protect the payload on the conveyor belt 76 from disturbance thereof by wind or precipitation, when the conveyor subassembly 38 is in the extended position.

Once the bin assembly 30 has been emptied of its payload, the conveyor subassembly is retracted, to its retracted condition (FIG. 1A). The car assembly 32 is then moved down the track 28 past an intermediate position (FIG. 2A) to the ground position thereof (FIG. 1C). As noted above, after the bin assembly has been unloaded and the car assembly 32 has returned to ground level, it is preferred that the empty bin assembly 30 is first removed, and to achieve this, the carriage subassembly 75B is moved to the unloading position, illustrated in FIG. 1C. It will be understood that, also as described above, the next loaded bin assembly 30 is then loaded into the housing subassembly 34 from the carriage subassembly 75A when it is in the loading position (FIG. 1D).

As noted above, in one embodiment, each of the carriage subassemblies 75 preferably includes the load cell 83. The weight of the loaded bin assembly preferably is first determined when it is positioned on the first carriage subassembly 75A (i.e., immediately before it enters the housing subassembly 34), and recorded in any suitable manner. Next, after the payload 22 has been discharged from that particular bin assembly 30, the emptied or discharged bin assembly 30 is weighed as it moves over the carriage subassembly 75B (i.e., immediately after it exits the housing subassembly 34). In the absence of a spill, the net amount of the payload 22 that was delivered to the reactor vessel from that particular bin assembly 30 is the difference between the loaded and empty weights, subject only to minor immaterial losses that may occur when the payload is discharged from the bin assembly or moved by the conveyor subassembly to the intermediate conveyor, or other minor losses inside the enclosure structure 90. Those skilled in the art would appreciate that, in one embodiment, data from the load cells 83 preferably is transmitted therefrom to one or more processors or similar devices for efficient processing thereof.

In general, parts of the walls of the housing subassembly 34 are omitted, and its roof is also omitted, for clarity of illustration. The car assembly with complete walls 48 and the roof 50 can be seen in FIG. 4B. It will be understood that the walls and the roof preferably are in place, and the doors 52, so that the cavity 54 is substantially enclosed when the doors 52 are closed. In this way, the payload 22 in the bin assembly 30 positioned in the housing subassembly 34, and the worker(s) in the housing subassembly 34, are generally protected from the weather.

Figure 9:
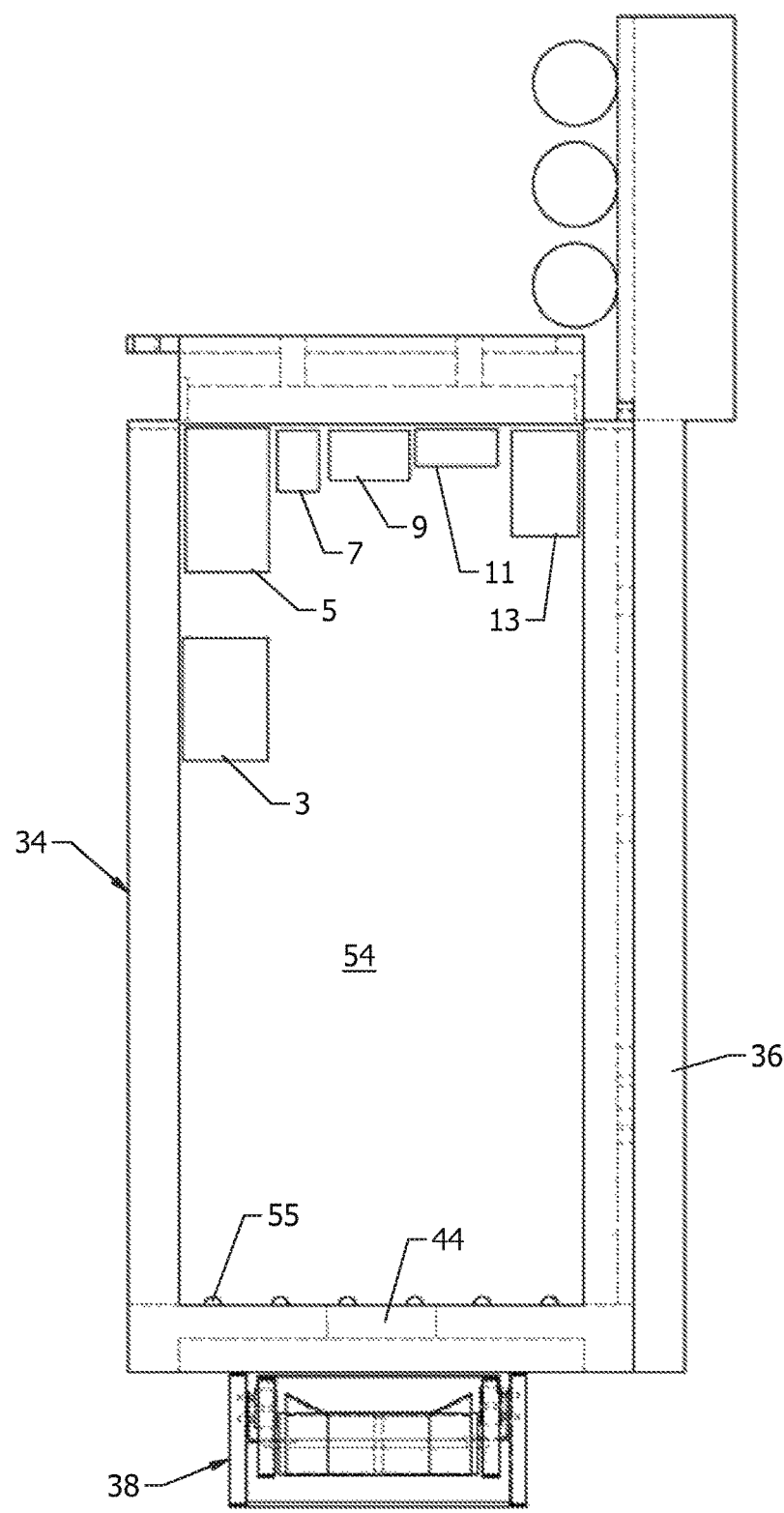
FIG. 9 is a cross-section of the car assembly schematically illustrating additional features thereof, drawn at a larger scale.
Figure 10A:
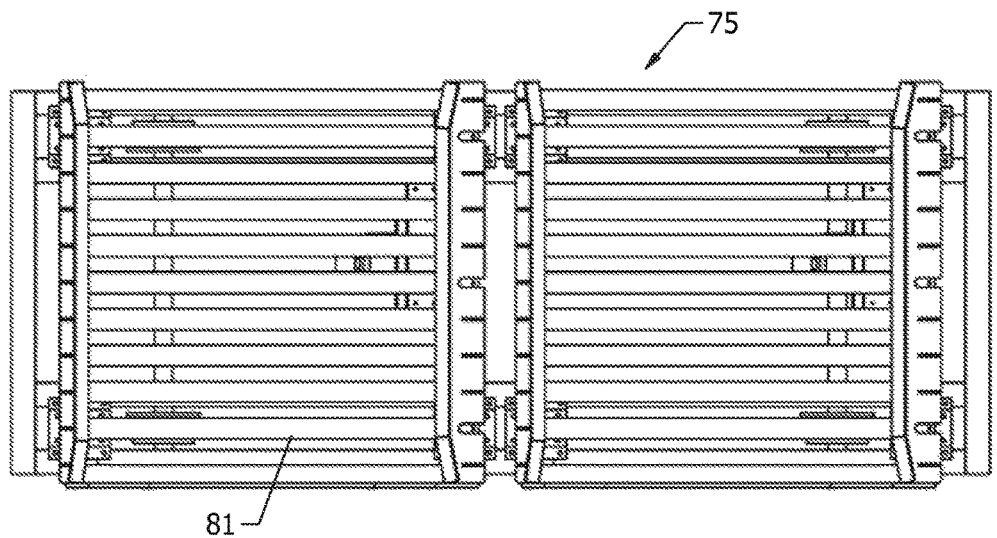
FIG. 10A is a top view of the carriage subassemblies of FIGS. 1C and 1D, drawn at a larger scale.
Figure 10B:
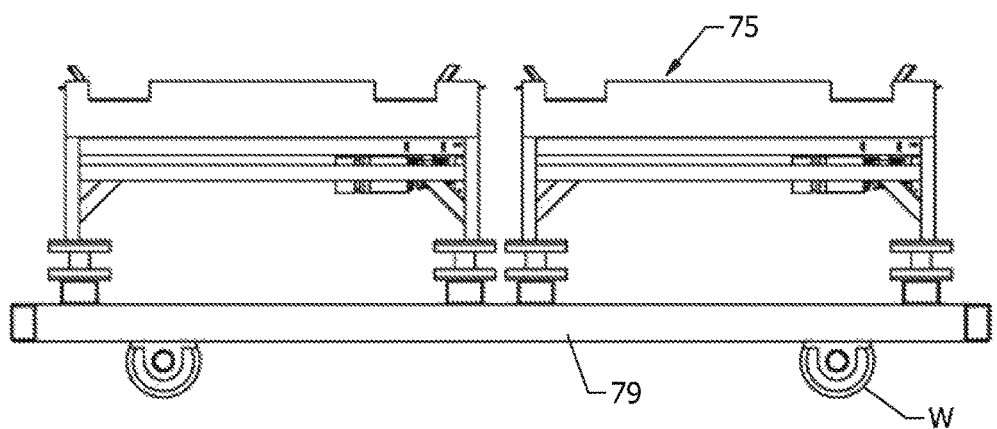
FIG. 10B is a side view of the carriage subassemblies of FIG. 10A.
Figure 10C:
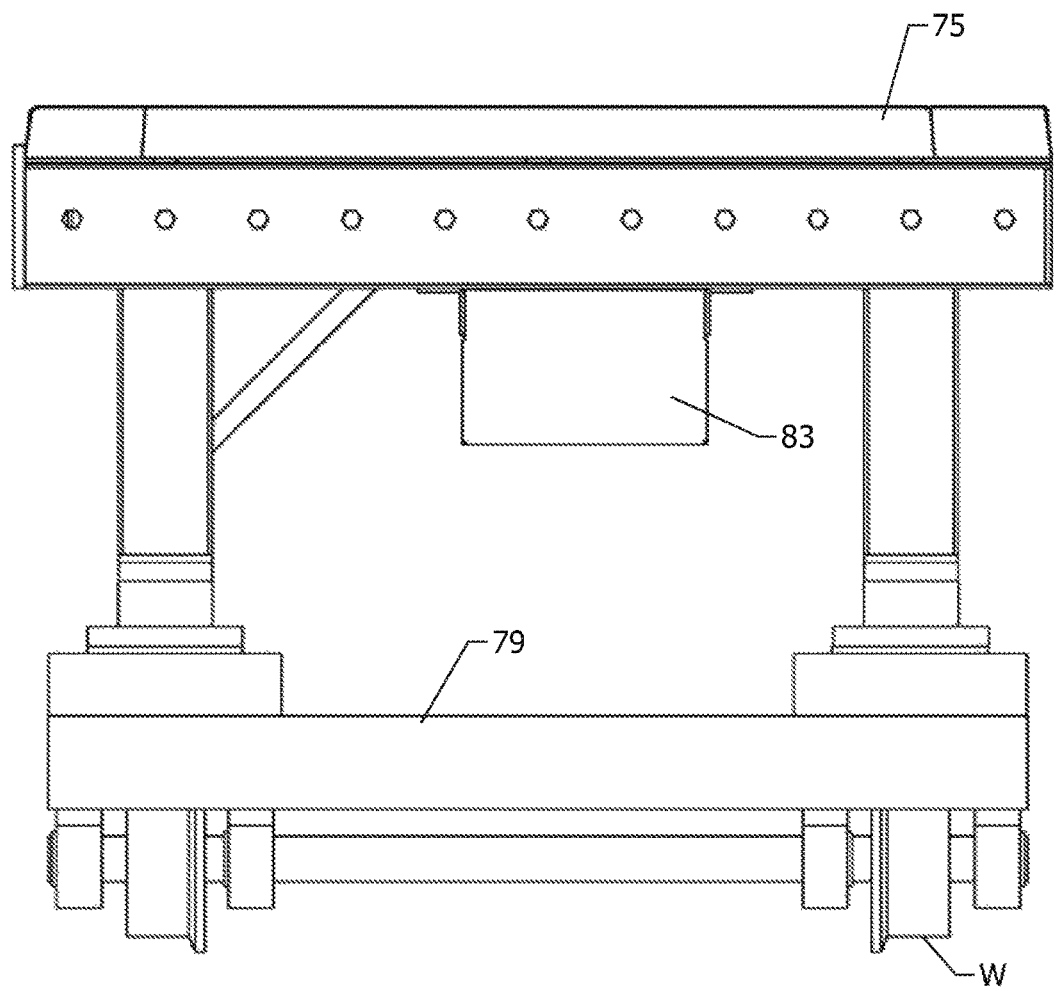
FIG. 10C is an end view of the carriage subassemblies of FIGS. 10A and 10B, drawn at a larger scale.
Figure 10D:
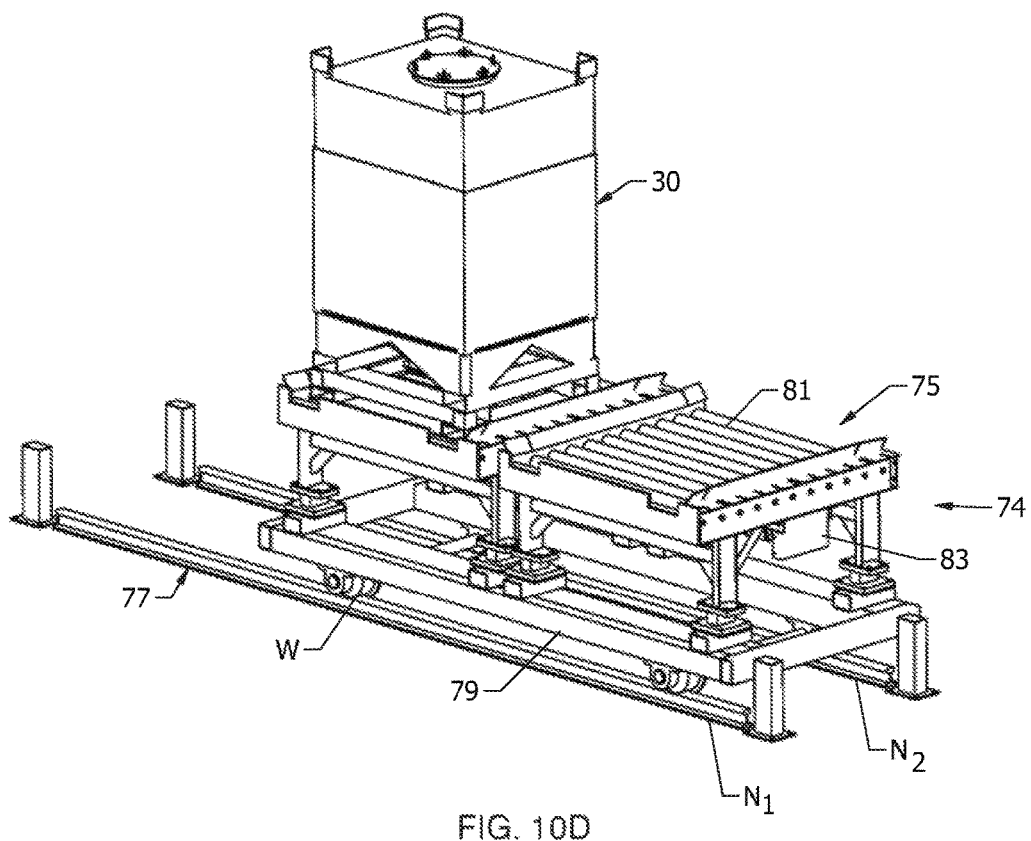
FIG. 10D is an isometric view of the transfer assembly of FIGS. 1C and 1D with the bin assembly positioned thereon, drawn at a smaller scale.

It is also preferred that the housing subassembly 34 includes various elements to provide for the safety and comfort of the workers located therein. These elements are schematically illustrated in FIG. 9, and include an atmospheric gas detection assembly 3, a dust control assembly 5, an emergency breathing air assembly 7, a fire suppression assembly 9, an air conditioning assembly 11, and a heating assembly 13. Preferably, the housing subassembly 34 also includes dual manway hatches (not shown) in the roof thereof, to permit workers inside to escape if necessary. Because these assemblies are known in the art, further description thereof is unnecessary.

Figure 11A:
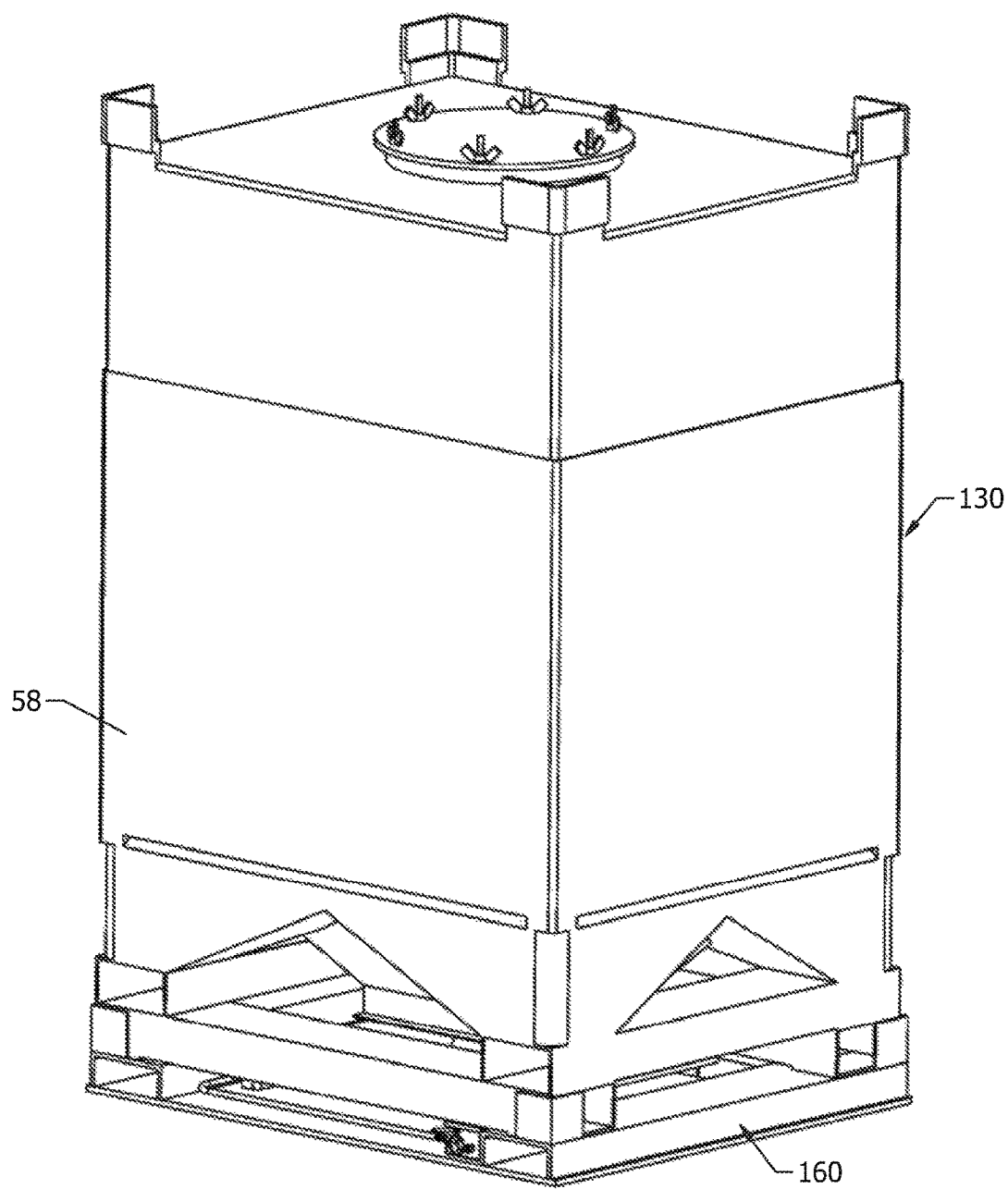
FIG. 11A is an isometric view of an alternative embodiment of a bin assembly of the invention, drawn at a larger scale.
Figure 11B:
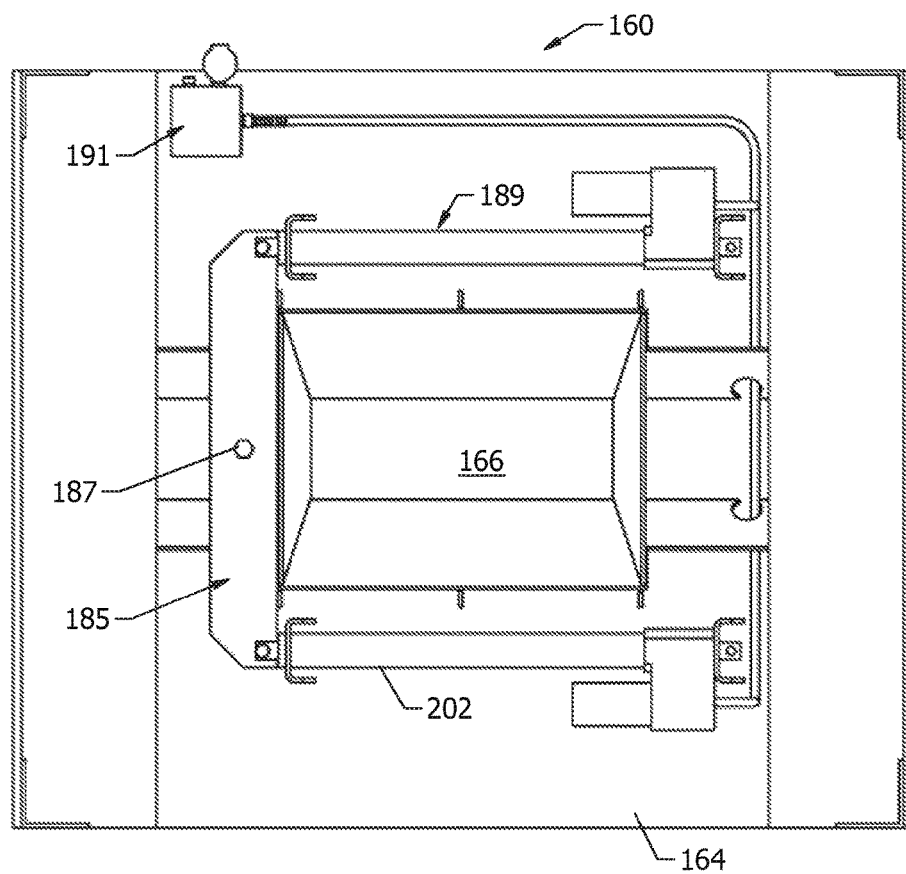
FIG. 11B is a top view of an alternative embodiment of a base pallet of the invention, drawn at a larger scale.
Figure 11C:
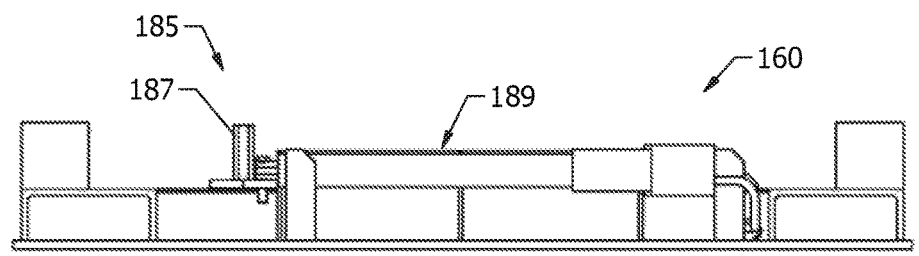
FIG. 11C is a side view of the base pallet of FIG. 11B.

An alternative embodiment of the bin assembly 130 of the invention is illustrated in FIG. 11A. The bin assembly 130 includes the container 58 and an alternative embodiment of the base pallet 160 of the invention that is illustrated in FIGS. 11B-11E. In one embodiment, an embodiment of the gate control device 185 of the invention preferably also includes a gate movement subassembly 189 activatable to move an engagement element 187 between a first position thereof, in which the gate 82 of the container 58 is located in the open position (as shown in FIGS. 7D, 7E), and a second position thereof, in which the gate 82 is located in the closed position (as shown in FIG. 7C).

Figure 11D:
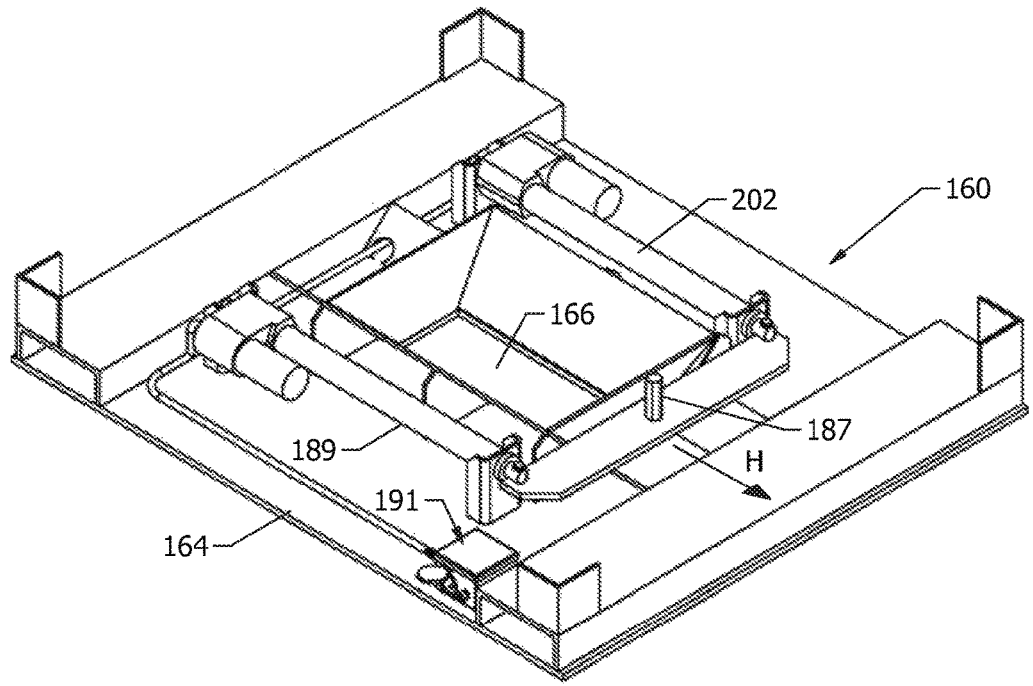
FIG. 11D is an isometric view of the base pallet of FIGS. 11B and 11C in which the engagement element is in a second position thereof.

It will be understood that the engagement element 187 fits into the hole "DH" of the tab "T" of the gate 82 when the container 58 (not shown in FIGS. 11B-11E) is positioned on the base pallet 160. In FIG. 11D, the engagement element 187 is shown in the second position, and in FIG. 11E, the engagement element 187 is shown in the first position thereof.

It is also preferred that the gate movement subassembly 189 is activatable by an activating element 191. The gate movement subassembly 189 preferably is powered in any suitable manner (e.g., electrical energy, hydraulic fluid), and the activating element 191 enables the worker to activate or de-activate the gate movement subassembly 189 relatively easily, as the worker considers appropriate. In this way, the worker can control the flow of the particulate matter of the payload out of the container 58 relatively easily.

In summary, an embodiment of the base pallet 160 of the invention is for use with the container 58. As described above, particulate matter is receivable in the container 58. The container 58 includes the opening 73 through which the particulate matter is movable out of the container 58 under the influence of gravity. Preferably, the container additionally includes the gate 82 movable between a closed position, in which the gate 82 obstructs the opening 73, and an open position, in which the opening 73 is unobstructed by the gate 82. In one embodiment, the base pallet 160 preferably also includes a base plate 164 having an aperture 166 therein. As is also described above, the container 58 is positionable on the base pallet 160 in a predetermined position in which the opening 73 is at least partially vertically aligned with the aperture 166. In one embodiment, the gate control device 185 preferably includes the engagement element 187, which is engageable with the gate 82 when the container 58 is in the predetermined position. It is also preferred that the gate control device 185 includes the gate control subassembly 189 for moving the engagement element 187 between the first position, in which the gate 82 is located by the engagement element 187 in the open position, and the second position, in which the gate 82 is located by the engagement element 187 in the closed position. The gate control device 185 preferably also includes the activating element 191 for controlling the gate control subassembly, to control movement of the engagement element 187 between the first and second positions.

Figure 11E:
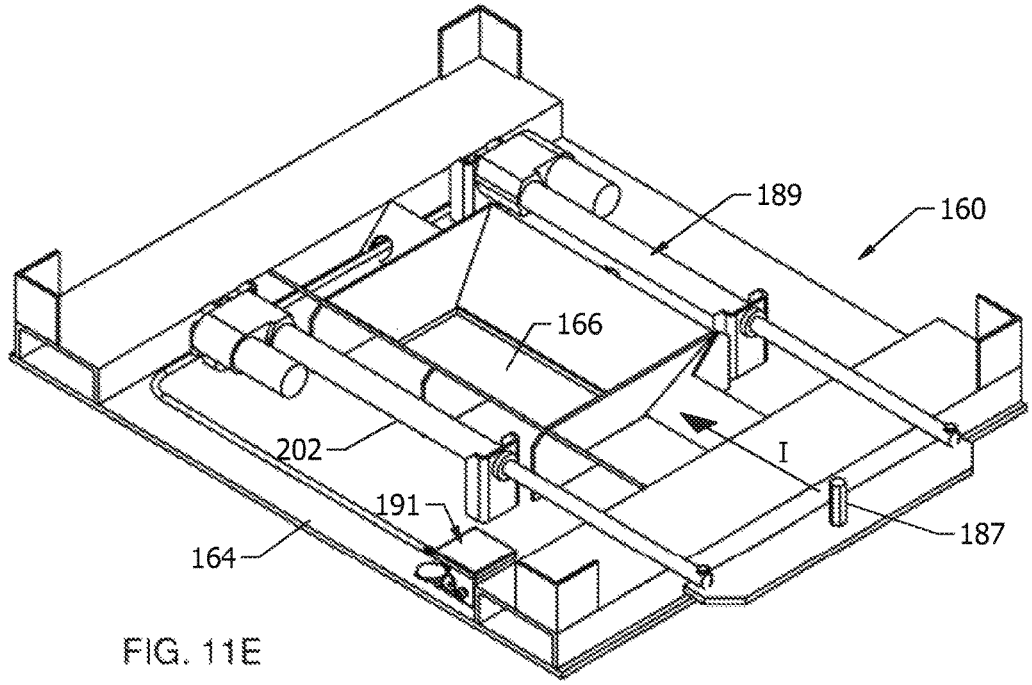
FIG. 11E is an isometric view of the base pallet of FIGS. 11B-11D in which the engagement element is in a first position thereof.
Figure 11F:
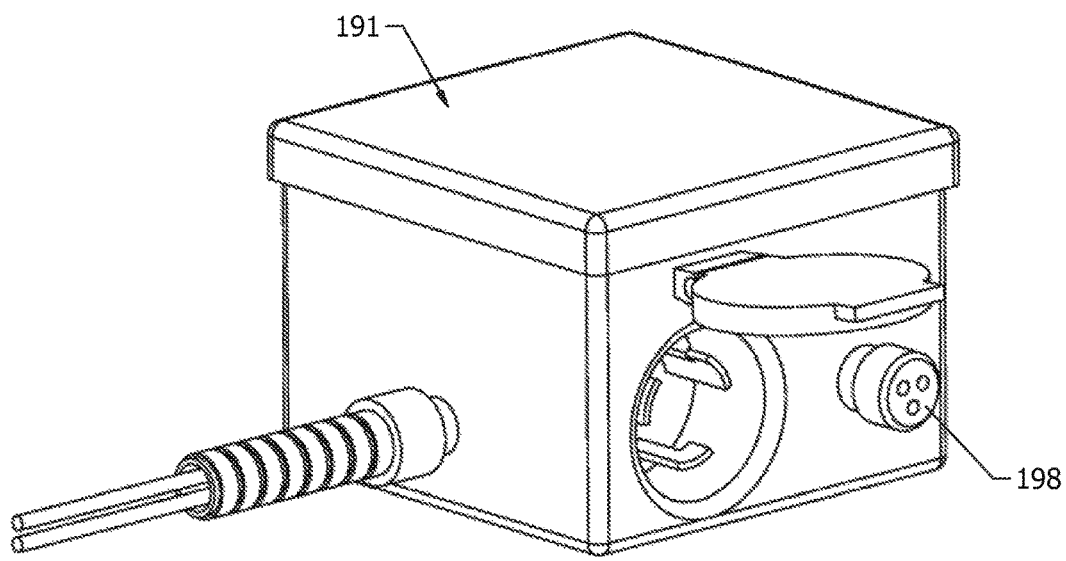
FIG. 11F is an isometric view of an embodiment of an activating element of the invention, drawn at a larger scale.
Figure 11G:
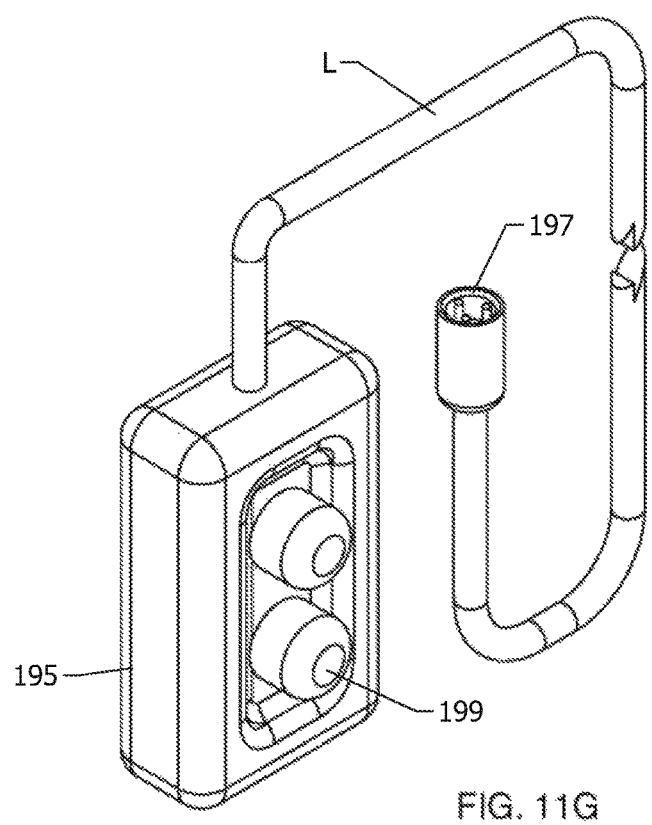
FIG. 11G is an isometric view of an embodiment of a control subassembly of the invention configured for connection with the activating element of FIG. 11F.

The base pallet 160 preferably includes an embodiment of the gate movement subassembly 189 controllable by the worker via an embodiment of a control subassembly 195 of the invention (FIG. 11G). In one embodiment, the gate movement subassembly 189 preferably includes a control receptacle 197 operatively connectable with the control subassembly 195 via a port 198 in the activating element (FIGS. 11F, 11G). The receptacle 197 and the control subassembly 195 preferably are connected by a cord element "L" through which signals are transmittable from the control subassembly 195 to the activating element 191.

For instance, in one embodiment, the gate movement subassembly 189 preferably is activatable by electrical energy, and includes one or more electric motors (not shown) that can cause telescoping elements 202 to extend or retract, to position the engagement element 187 relative to the base plate 164 as required, i.e., in the first or second positions, or therebetween. The worker preferably controls the gate movement subassembly 189 by activating or de-activating one or more electric motors via the activating element 191, to move the engagement element 187 between its first and second positions, and also to position it therebetween, as needed. This is achieved by the worker pushing buttons or other elements 199 on the control subassembly 195 as required, thereby causing appropriate signals to be transmitted to the activating element 191 for controlling the gate movement subassembly 189. As noted above, when the container 58 is positioned on the base pallet 160, the engagement element 187 engages the gate 82, so that the movement of the gate 82 is thereby effected when the gate movement subassembly 189 causes the engagement element 187 to move.

The gate movement subassembly 189, activatable via an energizing means, has been found to be advantageous because manual control of the gate 82 may be awkward or difficult in practice.

The engagement element 187 is shown in its first position in FIG. 11E, and it is shown in its second position in FIG. 11D. The movement of the engagement element 187 from its second position to the first position thereof is schematically illustrated by arrow "H" in FIG. 11D. As can be seen in FIG. 11E, when the engagement element 187 is in the first position thereof, the telescoping elements 202 are extended. The movement of engagement element 187 from the first position to the second position is schematically illustrated by arrow "I" in FIG. 11E. In FIG. 11D, the telescoping elements 202 are shown as being retracted. The gate movement subassembly 189 is configured to position the engagement element 187 in the first position or the second position or at any point therebetween. In this way, the worker can conveniently control the flow of the particulate matter of the payload to a fairly fine degree using the control subassembly 195.

Those skilled in the art would appreciate that, in addition, the control subassembly 195 preferably is configured to enable the worker conveniently to observe the flow of the payload 22 and to adjust the position of the gate 82 accordingly. For example, the connecting cord "L" preferably is as long as necessary to enable the worker to control the gate 82 as described above while observing the flow of the particulate matter of the payload into the reactor, or into the interim bin 86, as the case may be. As noted above, the gate 82 may be located in the first or second positions thereof, and any intermediate position(s) thereof. In practice, the control subassembly 189 provides the worker with greater ability to position himself where he can see the movement of the payload into or toward the reactor vessel, while still controlling discharge of the material from the container 58.

Another alternative embodiment of the base pallet 260 is illustrated in FIGS. 12A-12E, which includes an alternative embodiment of the gate control device 285. In this embodiment, the control subassembly 297 includes one or more foot pedals 201A, 201B. Preferably, the activating element 291 includes one or more foot pedals 201 configured for activation of the gate movement subassembly 289 by downward pressure on the foot pedal 201A. When the container 58 (not shown in FIGS. 12A-12D) is positioned on the base pallet 260, the engagement element 287 is located in the hole "DH" on the tab "T" of the gate 82 of the container 58. Accordingly, movement of the engagement element 287 results in movement of the gate 82, when the container 58 is positioned on the base pallet 260.

Figure 12A:
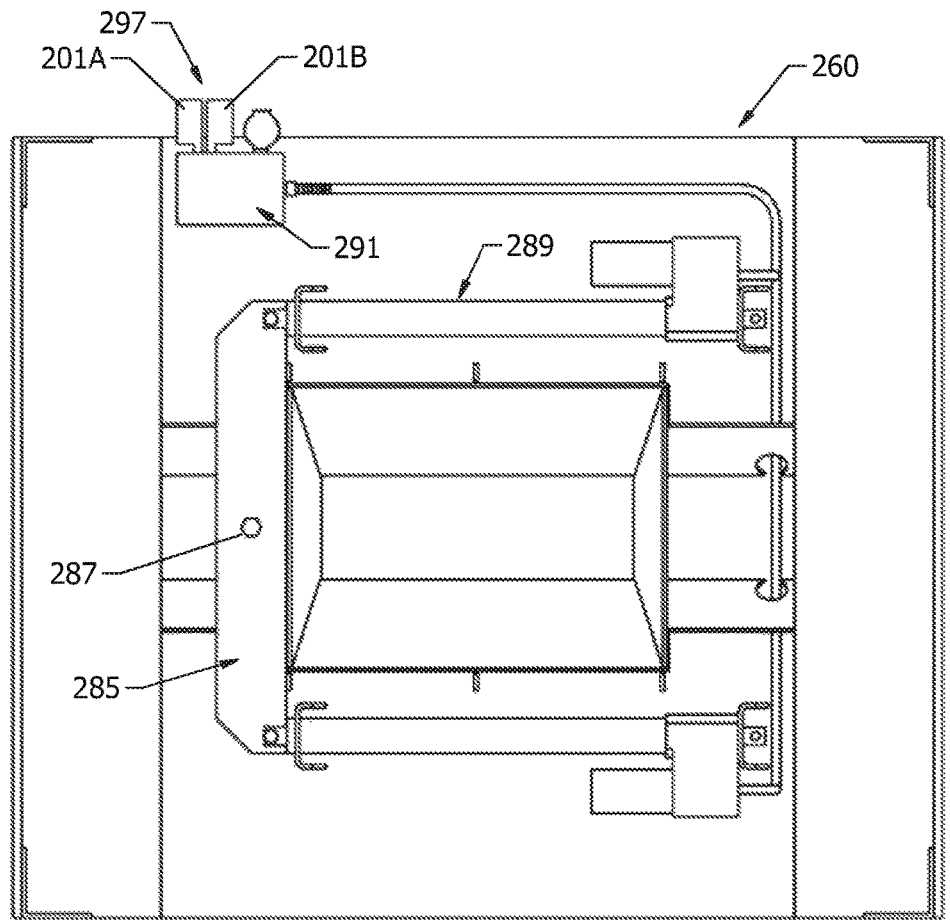
FIG. 12A is a top view of another alternative embodiment of the base pallet of the invention, drawn at a smaller scale.
Figure 12B:
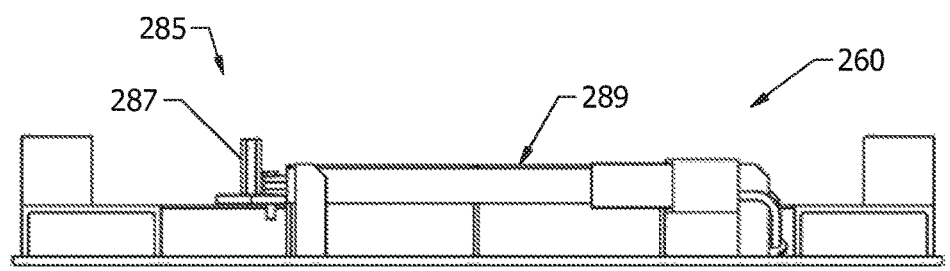
FIG. 12B is a side view of the base pallet of FIG. 12A.
Figure 12C:
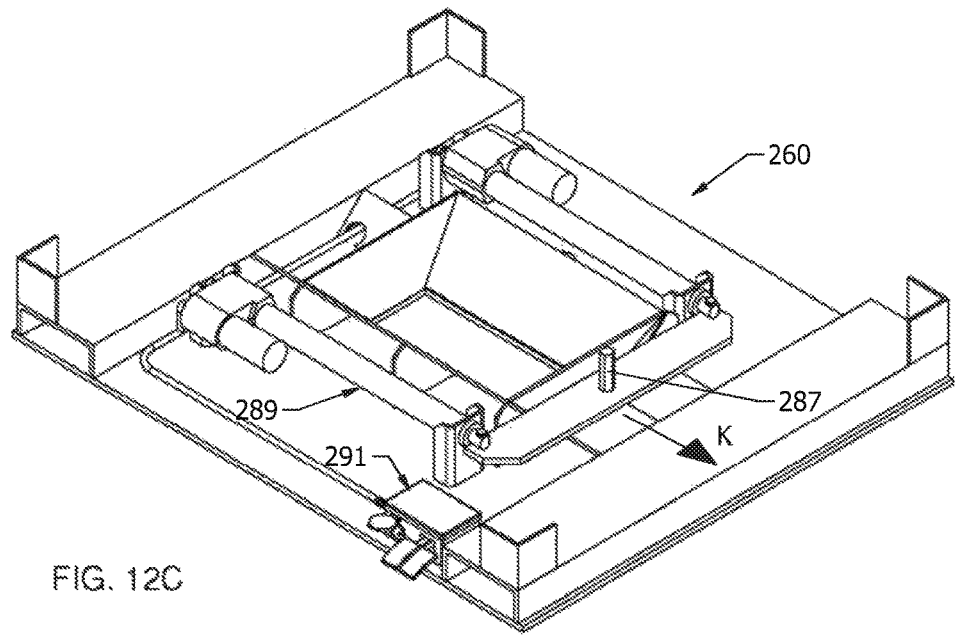
FIG. 12C is an isometric view of the base pallet of FIGS. 12A and 12B in which the engagement element is shown in a second position thereof.
Figure 12D:
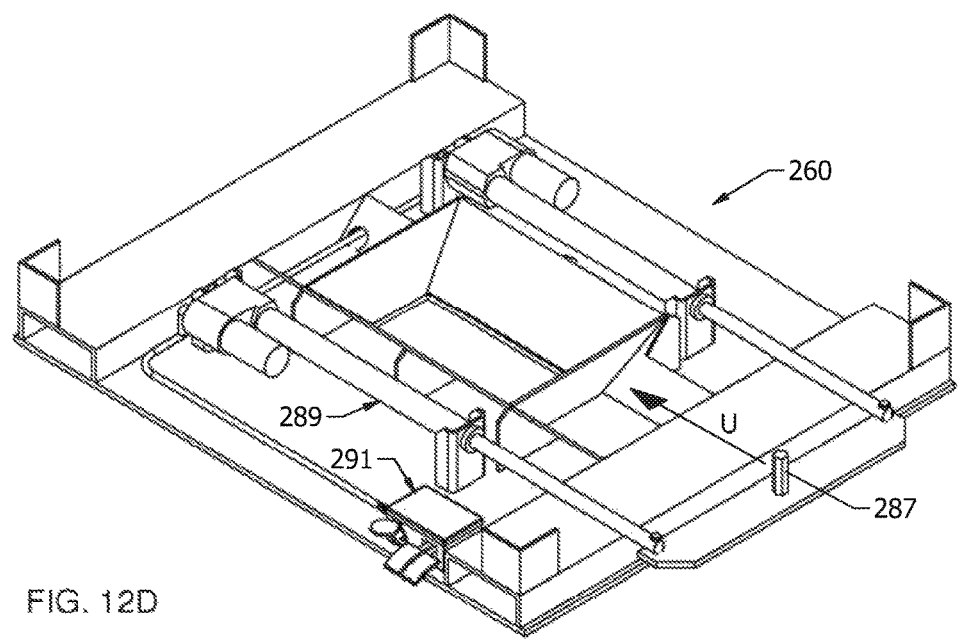
FIG. 12D is an isometric view of the base pallet of FIGS. 12A-12C in which the engagement element is shown in a first position thereof.
Figure 12E:
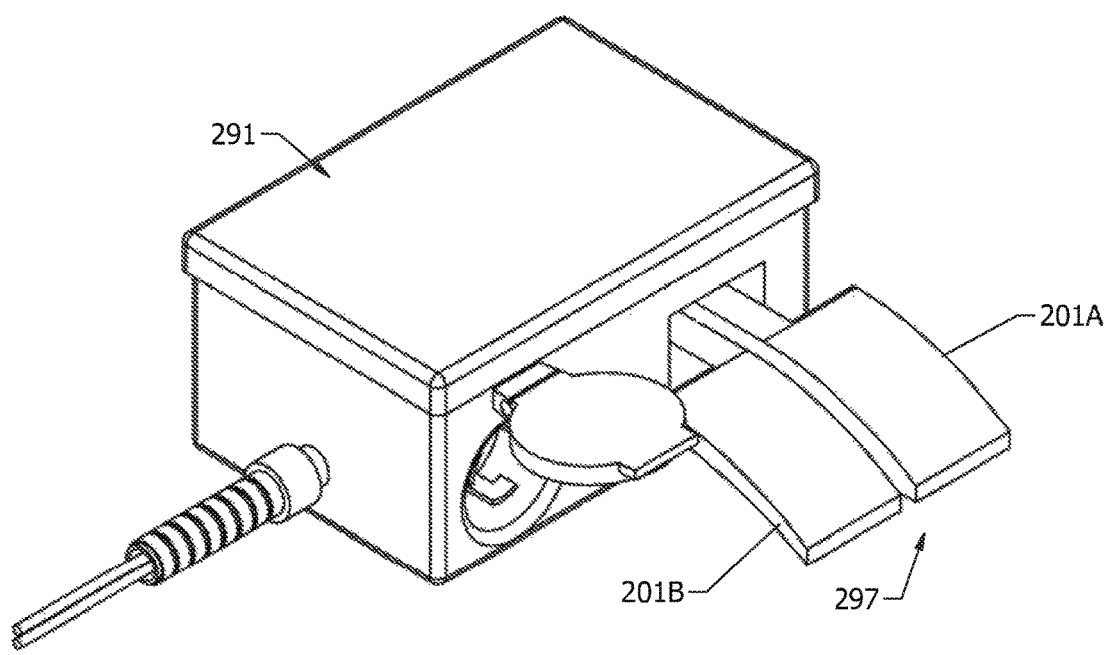
FIG. 12E is an isometric view of an activating element of the base pallet of FIGS. 12A-12D, drawn at a larger scale.

In FIG. 12C, the engagement element 287 is shown in a second position, in which the gate is held closed. It will be understood that, upon the worker depressing the pedal 201A, one or more signals are transmitted to the gate movement subassembly 289, so that the engagement element 287 is moved by the gate movement subassembly 289 toward the first position from the second position (FIG. 12C), i.e., in the direction indicated by arrow "K" in FIG. 12C. In FIG. 12D, the engagement element 287 is shown in a first position, in which the gate is held open. Upon the worker depressing the pedal 201B, one or more signals are transmitted to the gate movement subassembly 289, so that the engagement element 287 is moved by the gate control subassembly 289 toward the second position from the first position (FIG. 12D). This movement is indicated by arrow "U" in FIG. 12D. It will be understood that the gate movement subassembly 289 may locate the engagement element 287 at any point between the first and second positions.

It will be understood that the base pallet 260 may be preferred where the workers prefer to control the discharge of the payload 22 from the container 58 by using their feet, for convenience. It will also be understood that the control subassembly 295 preferably is configured to locate the gate 82 in its closed or open positions or in any intermediate position therebetween.

It will be understood that the container 58 as illustrated in FIGS. 1A-3A, 3D-4B, 6B-8, 10G, and 11A is exemplary only. Those skilled in the art would appreciate that the system 20 may be configured to deliver various payloads, which may be delivered to the site in various containers. For example, in one arrangement, the container 58 may be provided at the site by the payload manufacturer or supplier, with the payload positioned therein. The system 20 may be adapted to accommodate other types of containers and bin assemblies.

Figure 5A:
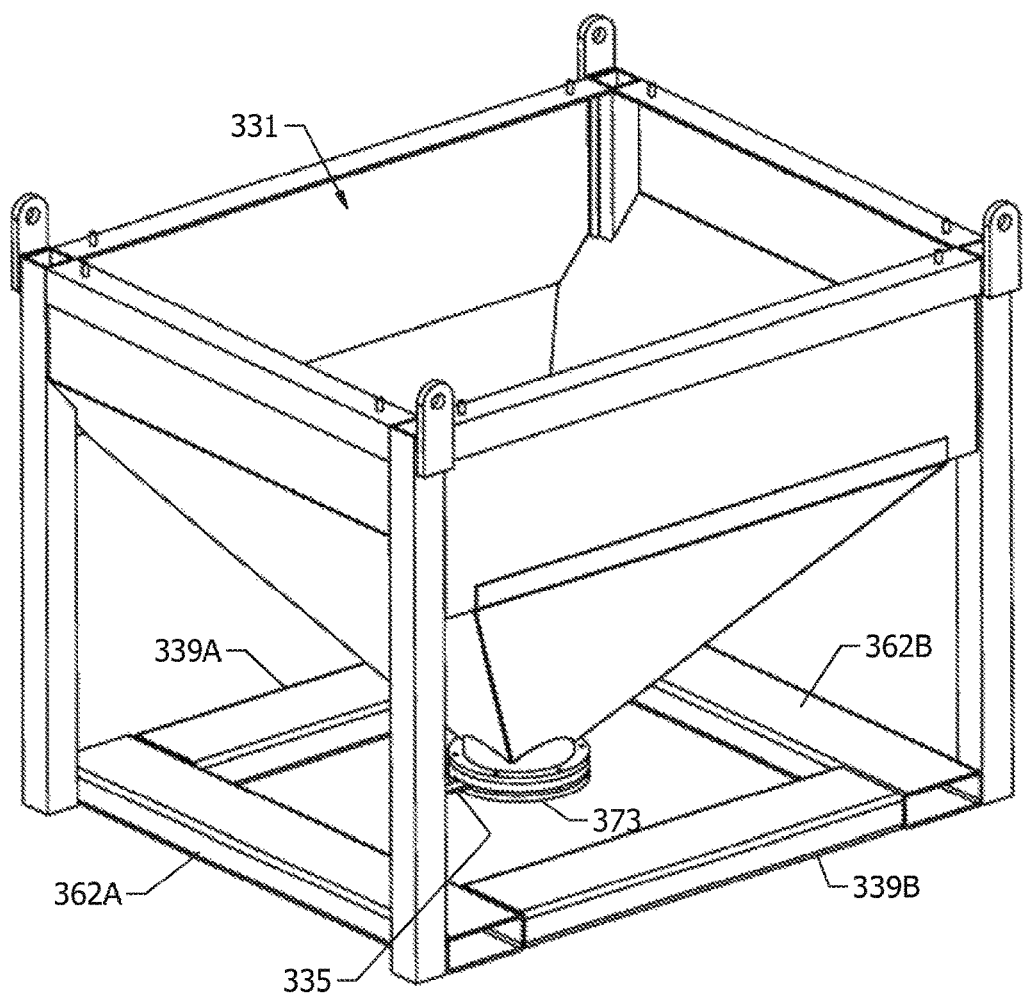
FIG. 5A is an isometric view of an alternative embodiment of a bin assembly of the invention, drawn at a larger scale.
Figure 5B:
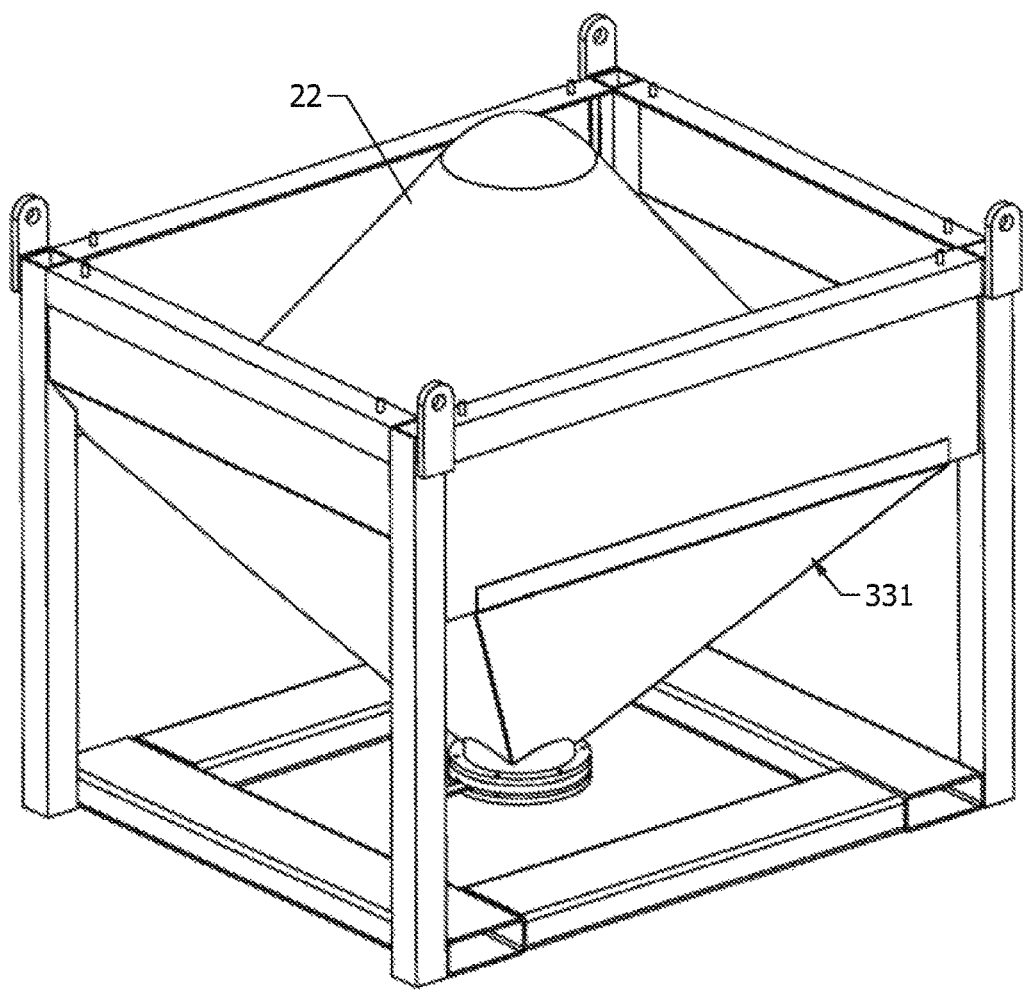
FIG. 5B is an isometric view of the bin assembly of FIG. 5A with a payload positioned therein.
Figure 5C:
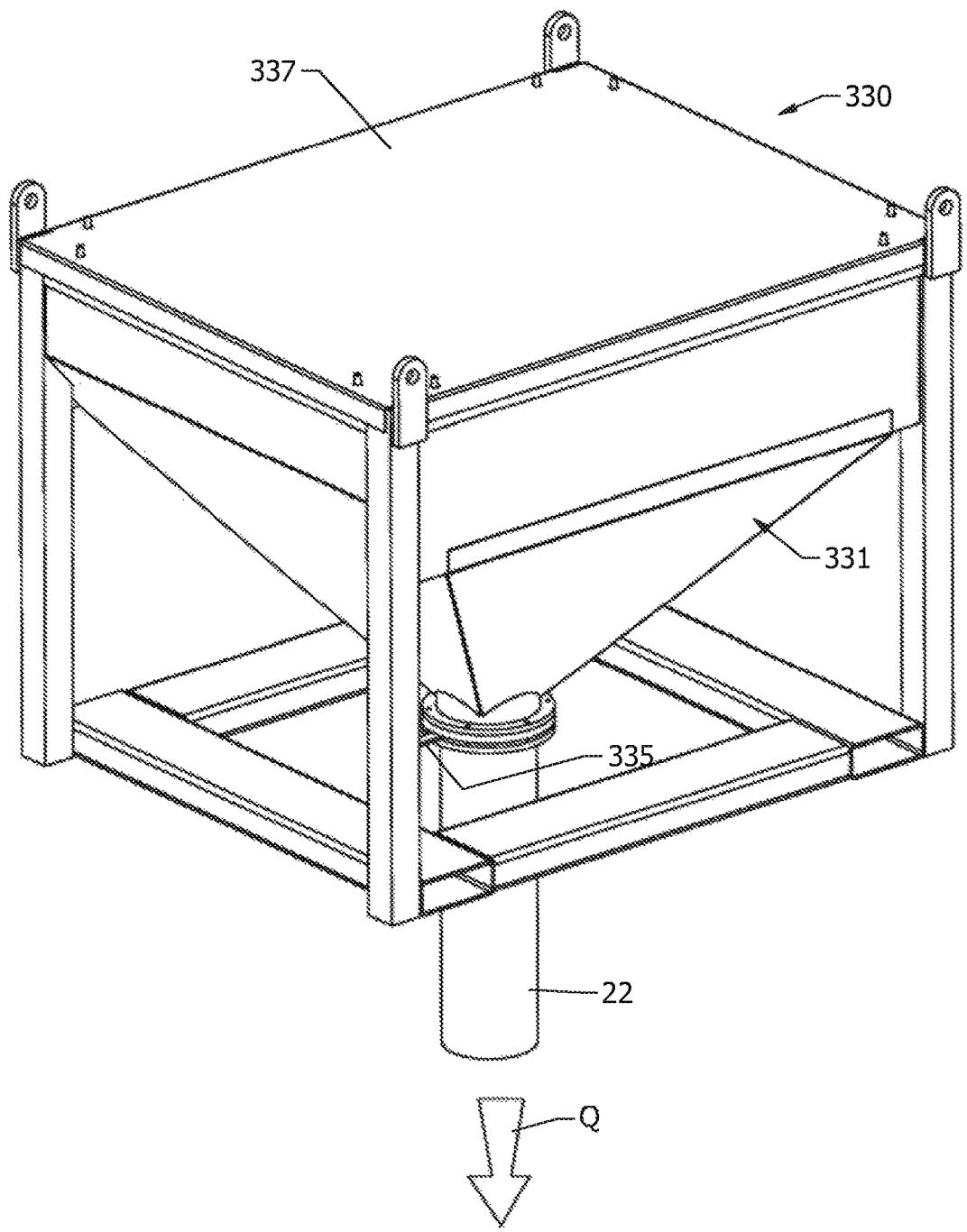
FIG. 5C is an isometric view of the bin assembly of FIG. 5B with a lid positioned thereon.

An alternative embodiment of a bin assembly 330 is illustrated in FIGS. 5A-5C. In this embodiment, the bin assembly 330 includes a body 331 that preferably is at least partially in the form of a hopper, tapering to a discharge outlet 373. As can be seen in FIG. 5A, the bin assembly 330 preferably also includes a gate device 335 mounted at the discharge outlet 373 to control the flow of the payload under the influence of gravity out of the bin assembly 330.

The bin assembly 330 is adapted to receive the payload 22 in the body 331 (FIG. 5B). The bin assembly 330 may be used where, for example, the payload 22 is provided at the site in bags or otherwise in bulk form, instead of being provided in the pre-loaded containers 58, i.e., as described above.

As can be seen in FIG. 5A, in one embodiment, the bin assembly 330 preferably includes sleeves 362A, 362B in which the forks of a forklift (not shown in FIGS. 5A-5C) are receivable. It is also preferred that the bin assembly 330 includes cross-members 339A, 339B positioned between the sleeves 362A, 362B. Those skilled in the art would appreciate that the arrangement of the sleeves 362A, 362B and the cross-members 339A, 339B enables the bin assembly 330 to be moved substantially horizontally in any direction on rollers.

Once the payload 22 is loaded into the body 331, a lid 337 preferably is positioned and secured on the body 331 (FIG. 5C). Next, the loaded bin assembly 330 is moved into the car assembly 32, in the same manner as described above in connection with the loaded bin assemblies 30. The car assembly 32 is then moved upwardly along the track 28, also in the same manner as described above. Once the car assembly 32 is in the discharge position and the conveyor subassembly 38 is in the extended position (not shown in FIGS. 5A-5C), the gate 335 is opened, to permit the payload 22 to exit the bin assembly 330 in the direction indicated by arrow "Q" in FIG. 5C, as schematically illustrated in FIG. 5C. As can be seen in FIGS. 5A-5C, the gate preferably is manually controllable via a lever movable between a closed position (FIGS. 5A, 5B) and an open position (FIG. 5C). Because the construction and operation of the gate is conventional, further description thereof is unnecessary. It will be understood that the payload 22 thus discharged is received on the conveyor belt 76, and moved by the conveyor belt 76 to the preselected release location "X", as described above.

Figure 13:
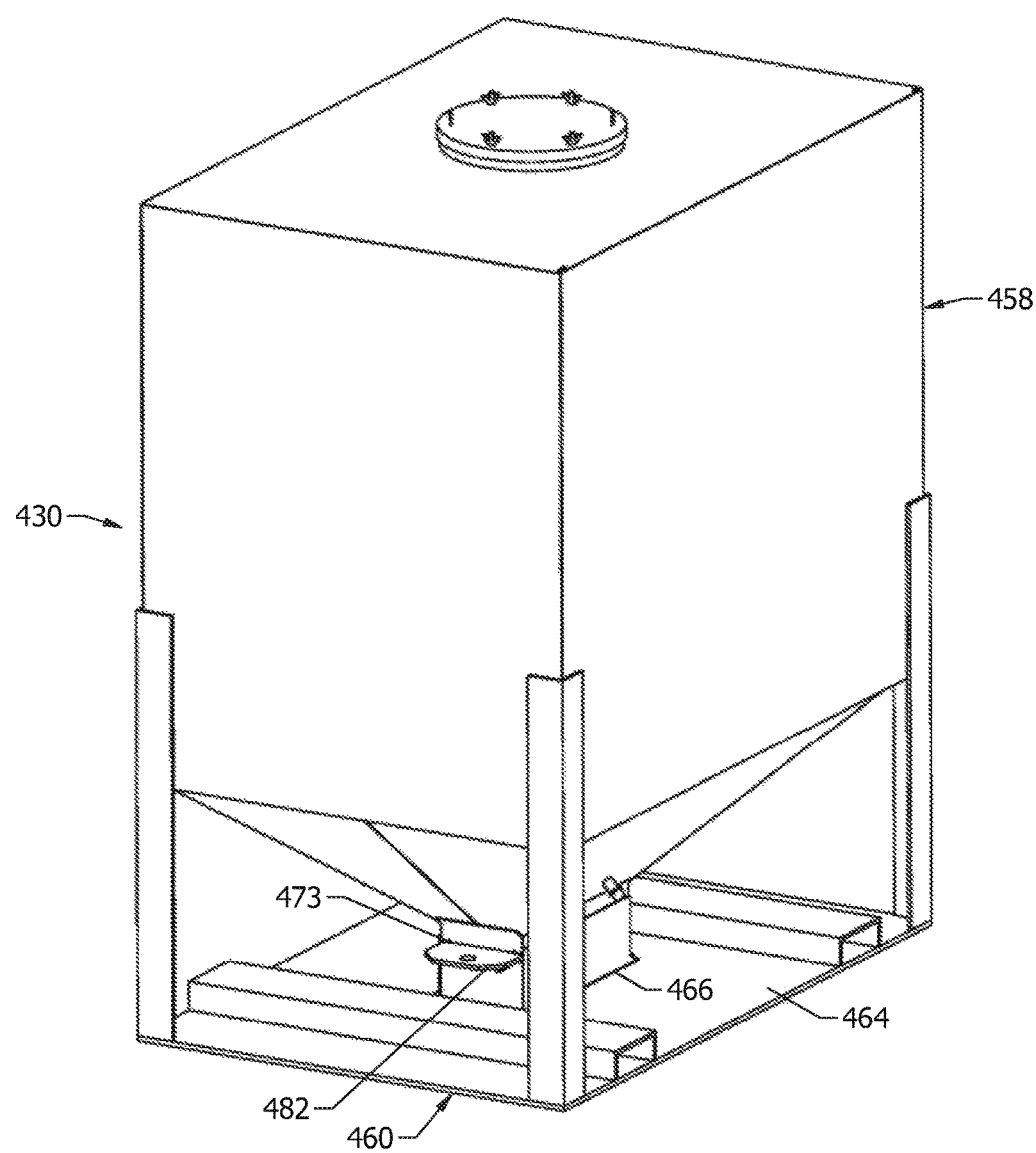
FIG. 13 is an isometric view of an alternative embodiment of the bin assembly of the invention, drawn at a smaller scale.

In another embodiment, a larger bin assembly 430 may be used (FIG. 13). In one embodiment, the payload 22 preferably is positioned in the bin assembly 430 at the site. For instance, the particulate matter of the payload may be delivered to the site by truck or rail or otherwise in bulk, and then positioned into a container portion 458 of the bin assembly 430 at the site. In one embodiment, and as can be seen in FIG. 13, the container 458 preferably is a integral part of the bin assembly 430 in which a base plate 464 and the container 458 are welded or otherwise secured together to form a unitary body. Those skilled in the art would appreciate that one advantage of the bin assembly 430 is that the container portion 458 can receive a relatively large payload. The larger container portion 458 would be advantageous because less vertical travel of the car assembly (i.e., fewer trips) would be needed to deliver a particular total amount of the particulate matter of the payload.

In summary, the particulate matter of the payload (e.g., the catalyst, or ceramic support material, or grading material) is receivable in the bin assembly 430. Preferably, the bin assembly 430 includes the container portion 458 in which the particulate matter is receivable. The container portion 458 includes an opening 473 through which the particulate matter is movable out of the container portion 458 under the influence of gravity. The bin assembly 430 preferably also includes a gate 482 movable between a closed position, in which the gate 482 obstructs the opening, and an open position, in which the opening is unobstructed by the gate, as described above. It is also preferred that the bin assembly 430 includes a base plate 464 for supporting the container portion 458. The base plate 464 preferably also includes an aperture 466 at least partially vertically aligned with the opening 473. Preferably, the bin assembly also includes the gate control device (not shown in FIG. 13) as described above for controlled movement of the gate 482 relative to the base plate 464.

As indicated in FIGS. 1C-2B, in one embodiment, the system 20 preferably also includes a second car assembly 32', mounted on an opposite side of the track assembly 26. Those skilled in the art would appreciate that adding the second car assembly 32' doubles the amount of the particulate matter of the payload that is deliverable to the reactor by the system. It has been determined that, using the container 58 (i.e., illustrated in FIGS. 3E and 11A), with the single car assembly 32, approximately 29 tonnes of the particulate matter are deliverable per hour. However, if the second car assembly 32' is also used, then the amount delivered is doubled, i.e., to approximately 58 tonnes per hour. From the foregoing, it can be seen that the system and method of the invention can result in much faster delivery of the particulate matter to the reactor vessel. Also, the second car assembly 32' provides a means for payload delivery even if the first car assembly 32 malfunctions.

As can be seen in FIG. 1A, in one embodiment, the system preferably also includes a crane 4 that is located on top of the track assembly 26. Those skilled in the art would appreciate that the crane 4 may be used for various tasks, e.g., to move equipment normally mounted on the reactor vessel at its top end in order to enable the particulate matter to be loaded into the reactor, as required.

INDUSTRIAL APPLICABILITY

In use, the payload is located in the car assembly 32, that is configured for substantially vertical movement along the track 28. The payload 22 may be provided in the car assembly in any suitable container. Next, the car assembly, with the payload therein, is raised to the preselected location in the vicinity of the top of the reactor vessel. The payload is moved at least partially transversely relative to the track from the car assembly to the opening at the top of the reactor vessel, for release of the payload into the reactor vessel via the opening.

Figure 14A:
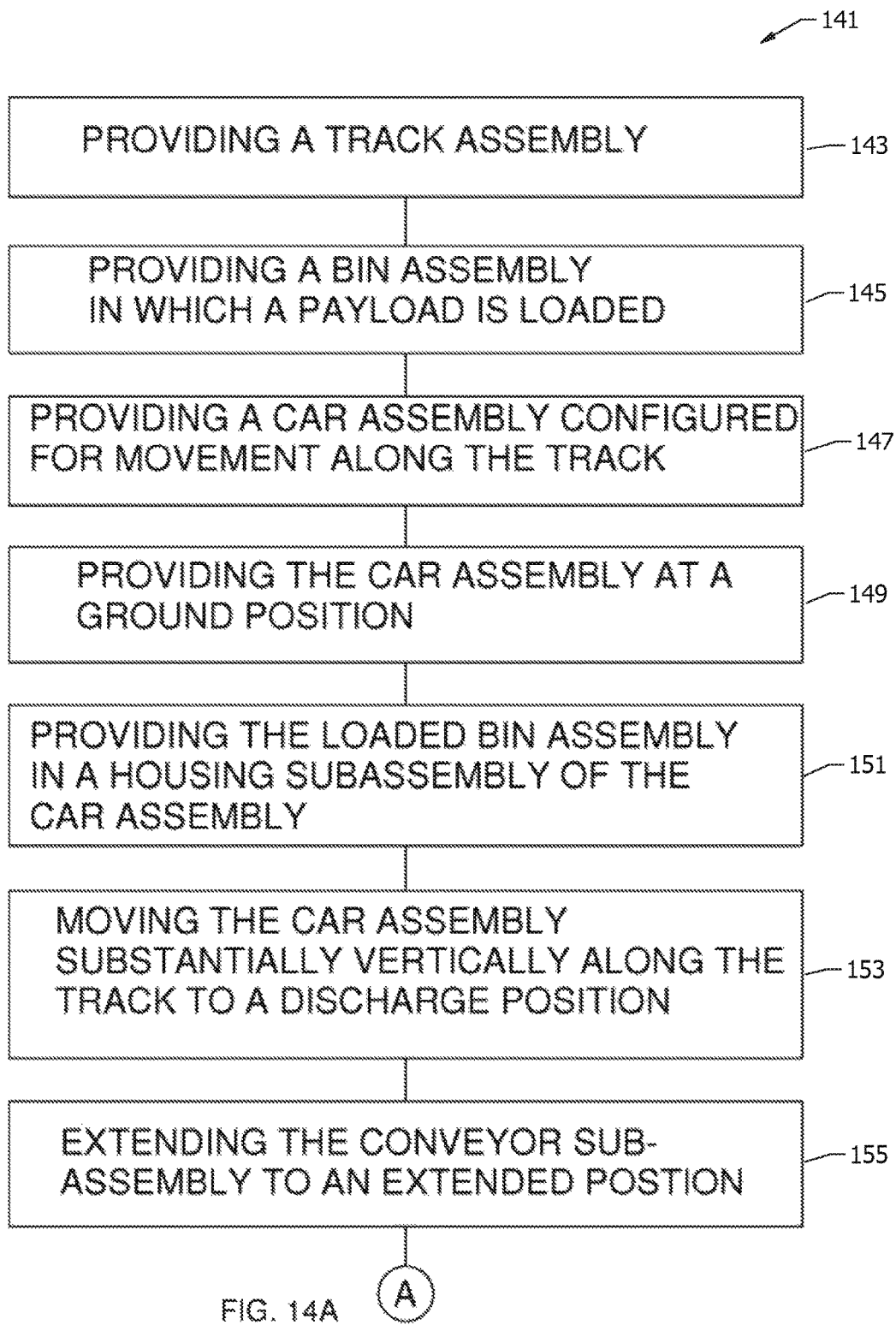
FIG. 14A is a flow chart schematically partially illustrating an embodiment of a method of the invention.
Figure 14B:
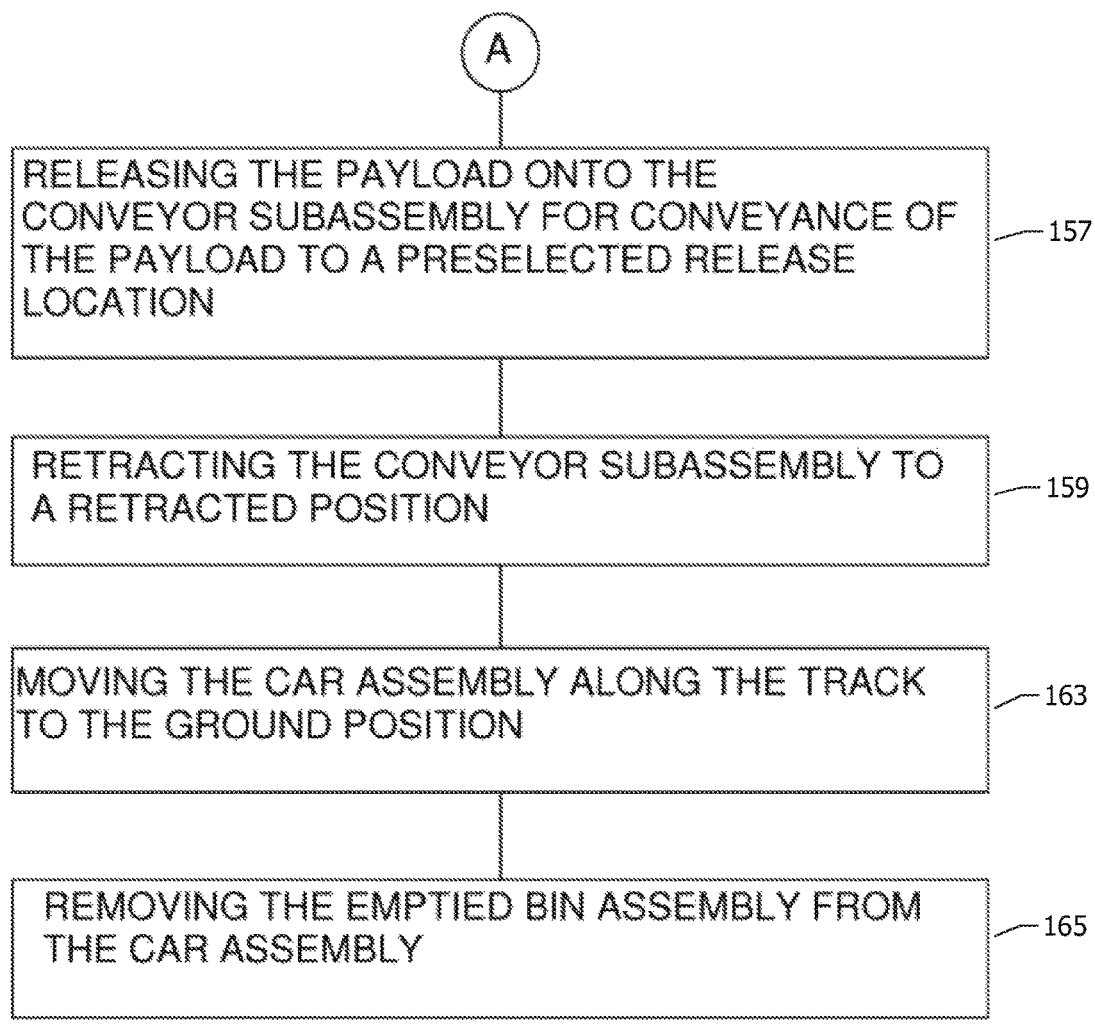
FIG. 14B is a flow chart schematically partially illustrating an embodiment of a method of the invention.

The invention also provides an embodiment of a method 141 of transporting the payload 22 substantially vertically and transversely to a preselected release location. In one embodiment, the method includes the steps of, first, providing the track assembly 26 having the substantially vertical track 28 (FIG. 14A, step 143). A loaded bin assembly 30 is provided (step 145). The car assembly 32, configured for movement along the track 28, is provided (step 147). Next, the car assembly 32 is positioned at a ground position (step 149). The loaded bin assembly 30 is positioned in the housing subassembly 34 of the car assembly 32 (step 151). The car assembly 32 is moved substantially vertically along the track 28 to a discharge position thereof (step 153). Next, while the car assembly is in the discharge position, the conveyor subassembly is extended to an extended condition thereof (step 155). The payload is released onto the conveyor subassembly 38 for conveyance of the payload thereby to the preselected release location, to provide an emptied bin assembly (FIG. 14B, step 157). Then the conveyor subassembly 38 is retracted to a retracted condition thereof (step 159). The car assembly 32 is moved substantially vertically along the track 28 to the ground position (step 163). The emptied bin assembly 30 is removed from the housing subassembly 34 (step 165). As described above, the next step would be to move another loaded bin assembly into the housing subassembly 34, and repeat the process.

It would be appreciated by those skilled in the art that, although certain steps are described above and illustrated in FIGS. 14A and 14B as occurring in a particular order, the order in which many of the steps are performed may be changed, because such steps are functionally independent of each other. For instance, all of steps 141-147 may be performed in orders other than the sequence described above and illustrated in FIGS. 14A and 14B.

From the foregoing, it can be seen that the system has the advantages that it has the capacity to deliver sufficient material per hour to meet requirements, and the operation of the system is not delayed by most inclement weather conditions. The system 20 is safer than the prior art method of using a crane. The system 20 has the additional advantage that the housing subassembly 34 may be used for transportation of workers and tools or other materials vertically, thereby saving significant time and effort. It is estimated that, through the use of the car assembly 32 in this way, productivity may be increased by approximately ten percent or more.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

I claim:

1. An elevation conveyance system for transporting a payload substantially vertically and transversely to a preselected release location, the system comprising:
   a track assembly comprising a substantially vertical track;
   at least one bin assembly in which the payload is receivable;
   at least one car assembly configured for movement along the track, said at least one car assembly comprising:
      a housing subassembly comprising a means for engaging the track to permit movement of said at least one car assembly along the track;
      a conveyor subassembly for transporting the payload substantially transversely relative to the track; and
   said at least one bin assembly being receivable in the housing subassembly and configured to release the payload onto the conveyor subassembly for substantially transverse transportation of the payload to the preselected release location;
   said at least one bin assembly comprising a container in which the payload is receivable, the container comprising an opening at a bottom end thereof coverable by a movable gate movable between an open position, where the opening is at least partially unobstructed by the gate to permit the payload to exit the container under the influence of gravity through the opening, and a closed position, where the opening is substantially obstructed by the gate; and
   said at least one bin assembly additionally comprising a base pallet comprising:
      a plate comprising an aperture at least partially alignable with the opening in the container, when the container is positioned on the base pallet; and
      a gate control device for moving the gate between the closed and open positions.

2. The elevation conveyance system according to claim 1 additionally comprising a transfer assembly for moving said at least one bin assembly at least partially into the housing subassembly.

3. The elevation conveyance system according to claim 2 in which the transfer assembly is configured for moving said at least one bin assembly at least partially out of the housing subassembly.

4. The elevation conveyance system according to claim 2 in which the transfer assembly comprises:
at least one carriage subassembly;
a carriage track on which said at least one carriage subassembly is movable, for movement of said at least one carriage subassembly between a loading position, in which said at least one carriage subassembly is located to at least partially move said at least one bin assembly into the housing subassembly, and an unloading position, in which said at least one carriage subassembly is located to at least partially move said at least one bin assembly out of the housing subassembly.

5. The elevation conveyance system according to claim 4 in which the transfer assembly comprises a frame on which said at least one carriage subassembly is mounted, and said at least one carriage subassembly comprises at least one transfer device engageable with said at least one bin assembly and configured to move said at least one bin assembly relative to said at least one frame when said at least one bin assembly is engaged by said at least one transfer device, upon activation of said at least one transfer device.

6. The elevation conveyance system according to claim 5 in which said at least one transfer device comprises a roller conveyor.

7. The elevation conveyance system according to claim 4 in which said at least one carriage subassembly comprises at least one load cell, for weighing said at least one bin assembly when said at least one bin assembly is positioned on said at least one carriage subassembly.

8. The elevation conveyance system according to claim 1 in which the base pallet additionally comprises a funnel formed to direct the payload into the aperture.

9. The elevation conveyance system according to claim 1 in which the base pallet comprises at least one receptacle guide element with which at least a part of the container is engageable, for locating the container in a predetermined position on the base pallet.

10. The elevation conveyance system according to claim 1 in which the gate control device comprises an engagement element engageable with the gate when the container is positioned on the base pallet, to move the gate between the open and the closed positions thereof.

11. The elevation conveyance system according to claim 10 in which the gate control device additionally comprises a gate movement subassembly activatable to move the engagement element between a first position thereof, in which the gate is located in the open position, and a second position thereof, in which the gate is located in the closed position thereof.

12. The elevation conveyance system according to claim 11 in which the gate movement subassembly is activatable by an activating element.

13. The elevation conveyance system according to claim 12 in which the activating element comprises at least one foot pedal configured for activation of the gate movement subassembly by downward pressure on said at least one foot pedal.

14. An elevation conveyance system for transporting a payload substantially vertically and transversely to a preselected release location, the system comprising:
a track assembly comprising a substantially vertical track;
at least one bin assembly in which the payload is receivable;
at least one car assembly configured for movement along the track, said at least one car assembly comprising:
a housing subassembly comprising a track engagement mechanism including an arm projecting outwardly from the housing subassembly for engaging the track to permit movement of said at least one car assembly along the track;
a conveyor subassembly for transporting the payload substantially transversely relative to the track; and
said at least one bin assembly being receivable in the housing subassembly and configured to release the payload onto the conveyor subassembly for substantially transverse transportation of the payload to the preselected release location;
said at least one bin assembly comprising a container in which the payload is receivable, the container comprising an opening at a bottom end thereof coverable by a movable gate movable between an open position, where the opening is at least partially unobstructed by the gate to permit the payload to exit the container under the influence of gravity through the opening, and a closed position, where the opening is substantially obstructed by the gate; and
said at least one bin assembly further comprising a base pallet comprising:
a plate comprising an aperture at least partially alignable with the opening in the container, when the container is positioned on the base pallet; and
a gate control device for moving the gate between the closed and open positions.

15. The elevation conveyance system according to claim 14 additionally comprising a transfer assembly for moving said at least one bin assembly at least partially into the housing subassembly.

16. The elevation conveyance system according to claim 15 in which the transfer assembly is configured for moving said at least one bin assembly at least partially out of the housing subassembly.

17. The elevation conveyance system according to claim 15 in which the transfer assembly comprises:
at least one carriage subassembly;
a carriage track on which said at least one carriage subassembly is movable, for movement of said at least one carriage subassembly between a loading position, in which said at least one carriage subassembly is located to at least partially move said at least one bin assembly into the housing subassembly, and an unloading position, in which said at least one carriage subassembly is located to at least partially move said at least one bin assembly out of the housing subassembly.

18. The elevation conveyance system according to claim 17 in which the transfer assembly comprises a frame on which said at least one carriage subassembly is mounted, and said at least one carriage subassembly comprises at least one transfer device engageable with said at least one bin assembly and configured to move said at least one bin assembly relative to said at least one frame when said at least one bin assembly is engaged by said at least one transfer device, upon activation of said at least one transfer device.

19. The elevation conveyance system according to claim 18 in which said at least one transfer device comprises a roller conveyor.

20. The elevation conveyance system according to claim 17 in which said at least one carriage subassembly comprises at least one load cell, for weighing said at least one bin assembly when said at least one bin assembly is positioned on said at least one carriage subassembly.

\* \* \* \* \*